United States Patent
Krishnan et al.

(10) Patent No.: US 12,476,479 B2
(45) Date of Patent: Nov. 18, 2025

(54) HYBRID BATTERY SYSTEM

(71) Applicant: FORM ENERGY, INC., Somerville, MA (US)

(72) Inventors: Ramkumar Krishnan, Gilbert, AZ (US); Shawn Fink, Mesa, AZ (US)

(73) Assignee: FORM ENERGY, INC., Somerville, MA (US)

( * ) Notice: Subject to any disclaimer, the term of this patent is extended or adjusted under 35 U.S.C. 154(b) by 0 days.

(21) Appl. No.: 18/535,643

(22) Filed: Dec. 11, 2023

(65) Prior Publication Data

US 2024/0396362 A1 Nov. 28, 2024

Related U.S. Application Data

(63) Continuation of application No. 18/307,355, filed on Apr. 26, 2023, now Pat. No. 12,191,702, which is a continuation of application No. 16/332,431, filed as application No. PCT/IB2017/055535 on Sep. 3, 2017, now Pat. No. 11,670,954.

(60) Provisional application No. 62/395,112, filed on Sep. 15, 2016.

(51) Int. Cl.
| | |
|---|---|
| *H01M 10/46* | (2006.01) |
| *H02J 7/00* | (2006.01) |
| *H02J 7/34* | (2006.01) |
| *H02J 7/35* | (2006.01) |
| *H02J 9/06* | (2006.01) |

(52) U.S. Cl.
CPC ............ *H02J 7/34* (2013.01); *H02J 7/0013* (2013.01); *H02J 7/0025* (2020.01); *H02J 7/0048* (2020.01); *H02J 7/0063* (2013.01); *H02J 7/0071* (2020.01); *H02J 7/00712* (2020.01); *H02J 7/35* (2013.01); *H02J 9/061* (2013.01); *H02J 2300/24* (2020.01); *H02J 2300/28* (2020.01); *H02J 2310/12* (2020.01)

(58) Field of Classification Search
CPC .... H02J 7/0048; H02J 7/0013; H02J 7/00712; H02J 7/35; H02J 7/0025; H02J 7/34; H02J 7/0063; H02J 7/0071; H02J 2300/28; H02J 2300/24; H02J 2310/12; H02J 9/061
USPC ........ 320/101, 103, 110, 116, 132, 134, 136
See application file for complete search history.

(56) References Cited

U.S. PATENT DOCUMENTS

| | | |
|---|---|---|
| 2,083,364 A | 6/1937 | Cook, Jr. |
| 2,643,276 A | 6/1953 | Salauze |
| 2,683,182 A | 7/1954 | Salauze |
| 3,219,486 A | 11/1965 | Salcedo |
| 3,223,611 A | 12/1965 | Wells et al. |
| 3,338,746 A | 8/1967 | Plust et al. |
| 3,378,406 A | 4/1968 | Rosansky |
| 3,483,036 A | 12/1969 | Gregor |
| 3,484,291 A | 12/1969 | Mackenzie et al. |
| 3,525,643 A | 8/1970 | Spahrbier et al. |
| 3,532,548 A | 10/1970 | Stachurski |
| 3,556,849 A | 1/1971 | Oswin et al. |
| 3,615,843 A | 10/1971 | Moran |
| 3,615,844 A | 10/1971 | Spengler |
| 3,650,837 A | 3/1972 | Palmer |
| 3,713,892 A | 1/1973 | Moran |
| 3,716,413 A | 2/1973 | Eisner |
| 3,717,505 A | 2/1973 | Unkle, Jr. et al. |
| 3,728,244 A | 4/1973 | Cooley |
| 3,785,868 A | 1/1974 | Devitt |
| 3,801,376 A | 4/1974 | Lindstrom |
| 3,822,149 A | 7/1974 | Hale |
| 3,840,455 A | 10/1974 | Cooley |
| 3,847,603 A | 11/1974 | Fukuda et al. |
| 3,850,696 A | 11/1974 | Summers |
| 3,886,426 A | 5/1975 | Dagget |
| 3,919,062 A | 11/1975 | Lundquist, Jr. et al. |
| 3,947,292 A | 3/1976 | Jackovitz et al. |
| 3,972,727 A | 8/1976 | Cohn |

(Continued)

FOREIGN PATENT DOCUMENTS

| | | |
|---|---|---|
| CA | 2847979 A1 | 10/2014 |
| CN | 101252213 A | 8/2008 |

(Continued)

OTHER PUBLICATIONS

Wilke et al. "Structural evolution of directionally freeze-cast iron foams during oxidation/reduction cycles." Acta Materialia 162 (2019): 90-102.

(Continued)

*Primary Examiner* — Edward Tso
(74) *Attorney, Agent, or Firm* — The Marbury Law Group, PLLC

(57) ABSTRACT

A stationary hybrid battery back-up system incorporates two different battery units that differ in terms of recharging efficiency, cycle life, power capability, depth of discharge threshold, temperature threshold, internal impedance threshold, charger rate efficiency and/or stand-by efficiency. The battery back-up system of the present invention comprises an auxiliary power supply that can be used to charge the first and second batteries and/or provide power to a load. When the operating voltage of the system drops, due to a power failure of a power source, the control system may couple the first and/or second battery unit to a load. The control system may have voltage threshold limits wherein it engages the first and second battery units to support the load demand. The first and second battery units may be charge by the auxiliary power supply when the operating voltage is above a threshold level.

18 Claims, 6 Drawing Sheets

(56) References Cited

U.S. PATENT DOCUMENTS

| | | |
|---|---|---|
| 4,119,772 A | 10/1978 | Peters et al. |
| 4,168,349 A | 9/1979 | Buzzelli |
| 4,201,653 A | 5/1980 | Ettel et al. |
| 4,246,324 A | 1/1981 | de Nora et al. |
| 4,250,236 A | 2/1981 | Haschka et al. |
| 4,312,927 A | 1/1982 | Salmon |
| 4,317,863 A | 3/1982 | Struthers |
| 4,340,449 A | 7/1982 | Srinivasan et al. |
| 4,384,928 A | 5/1983 | Hall |
| 4,385,101 A | 5/1983 | Catanzarite |
| 4,385,967 A | 5/1983 | Brady et al. |
| 4,444,858 A | 4/1984 | Nishibu et al. |
| 4,447,504 A | 5/1984 | Goebel |
| 4,448,858 A | 5/1984 | Graf et al. |
| 4,450,211 A | 5/1984 | Vignaud |
| 4,461,817 A | 7/1984 | Itoh et al. |
| 4,485,154 A | 11/1984 | Remick et al. |
| 4,521,497 A | 6/1985 | Tamminen |
| 4,552,630 A | 11/1985 | Wheeler et al. |
| 4,581,064 A | 4/1986 | Morrison et al. |
| 4,616,170 A | 10/1986 | Urstoeger |
| 4,684,585 A | 8/1987 | Tamminen |
| 4,691,158 A | 9/1987 | Hashimoto et al. |
| 4,693,946 A | 9/1987 | Niksa et al. |
| 4,730,153 A | 3/1988 | Breting et al. |
| 4,732,823 A | 3/1988 | Ito et al. |
| 4,828,942 A | 5/1989 | Licht |
| 4,842,963 A | 6/1989 | Ross, Jr. |
| 4,857,419 A | 8/1989 | Jinnai et al. |
| 4,871,627 A | 10/1989 | Strong et al. |
| 4,894,355 A | 1/1990 | Takeuchi et al. |
| 4,977,044 A | 12/1990 | Ludwig |
| 5,009,755 A | 4/1991 | Shor |
| 5,011,747 A | 4/1991 | Strong et al. |
| 5,104,497 A | 4/1992 | Tetzlaff et al. |
| 5,145,752 A | 9/1992 | Goldstein et al. |
| 5,164,272 A | 11/1992 | Lowton et al. |
| 5,185,218 A | 2/1993 | Brokman et al. |
| 5,190,833 A | 3/1993 | Goldstein et al. |
| 5,302,472 A | 4/1994 | Ando et al. |
| 5,318,861 A | 6/1994 | Harats et al. |
| 5,334,463 A | 8/1994 | Tajima et al. |
| 5,376,471 A | 12/1994 | Hunter et al. |
| 5,397,532 A | 3/1995 | Blaimschein |
| 5,411,815 A | 5/1995 | Goldstein |
| 5,415,949 A | 5/1995 | Stone et al. |
| 5,431,823 A | 7/1995 | Gofer |
| 5,432,022 A | 7/1995 | Cheiky |
| 5,434,020 A | 7/1995 | Cooper |
| 5,439,758 A | 8/1995 | Stone et al. |
| 5,440,221 A | 8/1995 | Landau et al. |
| 5,441,820 A | 8/1995 | Siu et al. |
| 5,451,475 A | 9/1995 | Ohta et al. |
| 5,458,988 A | 10/1995 | Putt |
| 5,549,991 A | 8/1996 | Licht et al. |
| 5,567,540 A | 10/1996 | Stone et al. |
| 5,569,551 A | 10/1996 | Pedicini et al. |
| 5,595,949 A | 1/1997 | Goldstein et al. |
| 5,614,331 A | 3/1997 | Takeuchi et al. |
| 5,650,240 A | 7/1997 | Rogers |
| 5,652,068 A | 7/1997 | Shuster et al. |
| 5,665,481 A | 9/1997 | Schuster et al. |
| 5,700,596 A | 12/1997 | Ikorna et al. |
| 5,733,677 A | 3/1998 | Golovin et al. |
| 5,788,943 A | 8/1998 | Aladjov |
| 5,850,136 A | 12/1998 | Kaneko |
| 5,935,724 A | 8/1999 | Spillman et al. |
| 5,935,728 A | 8/1999 | Spillman et al. |
| 5,938,899 A | 8/1999 | Forand |
| 5,972,531 A | 10/1999 | Kawakami |
| 5,993,983 A | 11/1999 | Rozon |
| 5,998,967 A | 12/1999 | Umeki et al. |
| 5,998,968 A | 12/1999 | Pittman et al. |
| 6,014,013 A | 1/2000 | Suppanz et al. |
| 6,025,696 A | 2/2000 | Lenhart et al. |
| 6,027,834 A | 2/2000 | Hayashi et al. |
| 6,034,506 A | 3/2000 | Hall |
| 6,046,514 A | 4/2000 | Rouillard et al. |
| 6,054,840 A | 4/2000 | Nakanishi et al. |
| 6,057,052 A | 5/2000 | Shrim et al. |
| 6,091,230 A | 7/2000 | Winzer |
| 6,118,248 A | 9/2000 | Gartstein et al. |
| 6,121,752 A | 9/2000 | Kitahara et al. |
| 6,127,061 A | 10/2000 | Shun et al. |
| 6,153,328 A | 11/2000 | Colborn |
| 6,162,555 A | 12/2000 | Gutierrez et al. |
| 6,165,638 A | 12/2000 | Spillman et al. |
| 6,194,098 B1 | 2/2001 | Ying et al. |
| 6,207,037 B1 | 3/2001 | Dartnell et al. |
| 6,210,832 B1 | 4/2001 | Visco et al. |
| 6,211,650 B1 | 4/2001 | Mumaw et al. |
| 6,228,535 B1 | 5/2001 | Fierro et al. |
| 6,249,940 B1 | 6/2001 | Asano et al. |
| 6,265,846 B1 | 7/2001 | Flechsig et al. |
| 6,268,085 B1 | 7/2001 | Manthiram et al. |
| 6,271,646 B1 | 8/2001 | Evers et al. |
| 6,277,508 B1 | 8/2001 | Reiser et al. |
| 6,312,846 B1 | 11/2001 | Marsh |
| 6,355,369 B1 | 3/2002 | Iarochenko et al. |
| 6,358,643 B1 | 3/2002 | Katz et al. |
| 6,379,828 B1 | 4/2002 | Worth |
| 6,383,673 B1 | 5/2002 | Faris et al. |
| 6,383,675 B1 | 5/2002 | Zhong |
| 6,410,174 B1 | 6/2002 | Faris |
| 6,416,649 B1 | 7/2002 | Ray et al. |
| 6,458,480 B1 | 10/2002 | Morris et al. |
| 6,465,638 B2 | 10/2002 | Gorman et al. |
| 6,472,093 B2 | 10/2002 | Faris et al. |
| 6,475,658 B1 | 11/2002 | Pedicini et al. |
| 6,537,701 B1 | 3/2003 | Nimon et al. |
| 6,541,941 B2 | 4/2003 | Adams et al. |
| 6,544,678 B2 | 4/2003 | Faris et al. |
| 6,558,830 B2 | 5/2003 | Faris et al. |
| 6,558,848 B1 | 5/2003 | Kobayashi et al. |
| 6,562,494 B1 | 5/2003 | Tsai et al. |
| 6,562,504 B2 | 5/2003 | Faris et al. |
| 6,566,000 B1 | 5/2003 | Iarochenko et al. |
| 6,569,555 B1 | 5/2003 | Faris et al. |
| 6,579,637 B1 | 6/2003 | Savage et al. |
| 6,586,909 B1 | 7/2003 | Trepka |
| 6,641,943 B1 | 11/2003 | Faris et al. |
| 6,646,418 B1 | 11/2003 | Xie et al. |
| 6,649,294 B2 | 11/2003 | Faris et al. |
| 6,653,252 B2 | 11/2003 | Kawahara |
| 6,673,490 B2 | 1/2004 | Miki et al. |
| 6,677,077 B2 | 1/2004 | Spillman et al. |
| 6,706,433 B2 | 3/2004 | Pinto et al. |
| 6,713,206 B2 | 3/2004 | Markoski et al. |
| 6,756,149 B2 | 6/2004 | Knights et al. |
| 6,762,587 B1 | 7/2004 | Barbetta |
| 6,764,588 B2 | 7/2004 | Smedley et al. |
| 6,787,260 B2 | 9/2004 | Smedley |
| 6,802,946 B2 | 10/2004 | Basol et al. |
| 6,811,903 B2 | 11/2004 | Vartak et al. |
| 6,822,423 B2 | 11/2004 | Yau et al. |
| 6,838,203 B2 | 1/2005 | Zheng |
| 6,849,172 B2 | 2/2005 | Rigby et al. |
| 6,849,356 B2 | 2/2005 | Dow et al. |
| 6,855,455 B1 | 2/2005 | Berger et al. |
| 6,858,347 B2 | 2/2005 | Tanigawa et al. |
| 6,866,950 B2 | 3/2005 | Connor et al. |
| 6,902,602 B2 | 6/2005 | Keefer et al. |
| 6,911,274 B1 | 6/2005 | Colborn et al. |
| 6,942,105 B2 | 9/2005 | Smedley et al. |
| 6,967,064 B2 | 11/2005 | Haltiner, Jr. et al. |
| 6,969,976 B1 | 11/2005 | Broach et al. |
| 6,986,964 B2 | 1/2006 | Faris et al. |
| 7,020,355 B2 | 3/2006 | Lahann et al. |
| 7,060,388 B2 | 6/2006 | Naruoka |
| 7,070,632 B1 | 7/2006 | Visco et al. |
| 7,126,310 B1 | 10/2006 | Barron |
| 7,150,933 B1 | 12/2006 | Mclean |
| 7,201,857 B2 | 4/2007 | Ovshinsky et al. |
| 7,226,676 B2 | 6/2007 | Faris et al. |

(56) References Cited

U.S. PATENT DOCUMENTS

| | | |
|---|---|---|
| 7,238,440 B2 | 7/2007 | Damore et al. |
| 7,252,898 B2 | 8/2007 | Markoski et al. |
| 7,270,906 B2 | 9/2007 | Haltiner, Jr. et al. |
| 7,273,541 B2 | 9/2007 | Choban et al. |
| 7,276,309 B2 | 10/2007 | Smedley et al. |
| 7,279,245 B1 | 10/2007 | Clark |
| 7,291,186 B2 | 11/2007 | Zhang et al. |
| 7,303,835 B2 | 12/2007 | Mathias et al. |
| 7,466,104 B2 | 12/2008 | Wang et al. |
| 7,468,221 B2 | 12/2008 | Lafollette et al. |
| 7,482,081 B2 | 1/2009 | Hong |
| 7,488,547 B1 | 2/2009 | Iacovelli |
| 7,494,729 B2 | 2/2009 | Odaohhara |
| 7,528,572 B2 | 5/2009 | Masias et al. |
| 7,535,199 B2 | 5/2009 | Kimura et al. |
| 7,598,706 B2 | 10/2009 | Koski et al. |
| 7,642,749 B2 | 1/2010 | Nishida |
| 7,670,575 B2 | 3/2010 | Jaervinen et al. |
| 7,670,705 B2 | 3/2010 | Ueda et al. |
| 7,670,724 B1 | 3/2010 | Chan et al. |
| 7,722,988 B2 | 5/2010 | Webber |
| 7,939,190 B2 | 5/2011 | Colello et al. |
| 8,058,165 B2 | 11/2011 | Kawano et al. |
| 8,168,337 B2 | 5/2012 | Friesen et al. |
| 8,222,865 B2 | 7/2012 | Lim et al. |
| 8,309,259 B2 | 11/2012 | Friesen et al. |
| 8,329,346 B2 | 12/2012 | Rensburg et al. |
| 8,384,351 B2 | 2/2013 | Monden et al. |
| 8,397,508 B2 | 3/2013 | Weimer et al. |
| 8,427,098 B2 | 4/2013 | Moore et al. |
| 8,491,763 B2 | 7/2013 | Friesen |
| 8,492,052 B2 | 7/2013 | Friesen et al. |
| 8,659,268 B2 | 2/2014 | Krishnan et al. |
| 8,758,948 B2 | 6/2014 | Narayan et al. |
| 8,877,391 B2 | 11/2014 | Friesen et al. |
| 8,895,197 B2 | 11/2014 | Friesen et al. |
| 8,906,563 B2 | 12/2014 | Friesen et al. |
| 8,911,910 B2 | 12/2014 | Krishnan et al. |
| 9,065,120 B2 | 6/2015 | Carlson |
| 9,172,123 B2 | 10/2015 | Albertus et al. |
| 9,269,998 B2 | 2/2016 | Hayes et al. |
| 9,312,572 B2 | 4/2016 | Trimble et al. |
| 9,325,037 B2 | 4/2016 | Trimble et al. |
| 9,368,486 B2 | 6/2016 | Wang et al. |
| 9,368,788 B2 | 6/2016 | Ogg et al. |
| 9,419,273 B2 | 8/2016 | Kakeya et al. |
| 9,440,132 B2 | 9/2016 | Brewer et al. |
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Visco et al. |
| 9,680,151 B2 | 6/2017 | Mullins et al. |
| 9,680,154 B2 | 6/2017 | Chen et al. |
| 9,780,379 B2 | 10/2017 | Zhamu et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,947,481 B2 | 4/2018 | Solomon et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 11,552,290 B2 | 1/2023 | Chakraborty et al. |
| 11,670,954 B2 * | 6/2023 | Krishnan ............. H02J 7/0025 320/110 |
| 2001/0007725 A1 | 7/2001 | Faris et al. |
| 2002/0015871 A1 | 2/2002 | Tao et al. |
| 2002/0028372 A1 | 3/2002 | Ohlsen et al. |
| 2002/0045075 A1 | 4/2002 | Pinto et al. |
| 2002/0076602 A1 | 6/2002 | Finkelshtain et al. |
| 2002/0098398 A1 | 7/2002 | Chen |
| 2002/0142203 A1 | 10/2002 | Ma et al. |
| 2002/0146600 A1 | 10/2002 | Vartak et al. |
| 2002/0155351 A1 | 10/2002 | Licht |
| 2003/0054217 A1 | 3/2003 | Faris |
| 2003/0077501 A1 | 4/2003 | Knights et al. |
| 2003/0099882 A1 | 5/2003 | Hampden-Smith et al. |
| 2003/0134163 A1 | 7/2003 | Markoski et al. |
| 2003/0143446 A1 | 7/2003 | Faris et al. |
| 2003/0165727 A1 | 9/2003 | Priestnall et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0121208 A1 | 6/2004 | James et al. |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0221426 A1 | 11/2004 | Igawa et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2004/0265684 A1 | 12/2004 | Faris et al. |
| 2005/0019634 A1 | 1/2005 | Legg et al. |
| 2005/0019651 A1 | 1/2005 | Tsai et al. |
| 2005/0031911 A1 | 2/2005 | Venkatesan et al. |
| 2005/0042503 A1 | 2/2005 | Kim et al. |
| 2005/0084737 A1 | 4/2005 | Wine et al. |
| 2005/0123815 A1 | 6/2005 | Tsai et al. |
| 2005/0170245 A1 | 8/2005 | Vartak et al. |
| 2005/0196656 A1 | 9/2005 | Gomez et al. |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | Lafollette et al. |
| 2006/0040174 A1 | 2/2006 | Peabody |
| 2006/0076295 A1 | 4/2006 | Leonard et al. |
| 2006/0077604 A1 | 4/2006 | Jansen |
| 2006/0127731 A1 | 6/2006 | Faris et al. |
| 2006/0194107 A1 | 8/2006 | Licht |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0292407 A1 | 12/2006 | Gervasio et al. |
| 2007/0020496 A1 | 1/2007 | Pelton et al. |
| 2007/0031714 A1 | 2/2007 | Huang |
| 2007/0048577 A1 | 3/2007 | Ringeisen et al. |
| 2007/0077491 A1 | 4/2007 | Burchardt |
| 2007/0092787 A1 | 4/2007 | Chen |
| 2007/0120091 A1 | 5/2007 | Ovshinsky et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0141456 A1 | 6/2007 | Wang et al. |
| 2007/0154766 A1 | 7/2007 | Baik et al. |
| 2007/0166602 A1 | 7/2007 | Burchardt |
| 2007/0184314 A1 | 8/2007 | Kagami |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0287034 A1 | 12/2007 | Minteer et al. |
| 2008/0003490 A1 | 1/2008 | Christensen et al. |
| 2008/0008911 A1 | 1/2008 | Stroock et al. |

(56) References Cited

U.S. PATENT DOCUMENTS

| | | |
|---|---|---|
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0131762 A1 | 6/2008 | Joo et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0231231 A1 | 9/2008 | Hartzog |
| 2008/0241617 A1 | 10/2008 | Sato |
| 2008/0252257 A1 | 10/2008 | Sufrin-Disler et al. |
| 2008/0268341 A1 | 10/2008 | Zhang |
| 2009/0027006 A1 | 1/2009 | Vezzini et al. |
| 2009/0081488 A1 | 3/2009 | Sato et al. |
| 2009/0117429 A1 | 5/2009 | Zillmer et al. |
| 2009/0123796 A1 | 5/2009 | Takahashi et al. |
| 2009/0167242 A1 | 7/2009 | Naganuma et al. |
| 2009/0230921 A1 | 9/2009 | Hsu et al. |
| 2009/0284299 A1 | 11/2009 | Izumi |
| 2009/0286149 A1 | 11/2009 | Cl et al. |
| 2009/0305090 A1 | 12/2009 | Chuang |
| 2010/0001737 A1 | 1/2010 | Kubo et al. |
| 2010/0025769 A1 | 2/2010 | Hook et al. |
| 2010/0060236 A1 | 3/2010 | Delaille et al. |
| 2010/0062303 A1 | 3/2010 | Bae et al. |
| 2010/0062313 A1 | 3/2010 | Browning et al. |
| 2010/0066169 A1 | 3/2010 | Apfel |
| 2010/0119883 A1 | 5/2010 | Friesen et al. |
| 2010/0119895 A1 | 5/2010 | Friesen |
| 2010/0285375 A1 | 11/2010 | Friesen et al. |
| 2010/0308765 A1 | 12/2010 | Moore et al. |
| 2010/0310905 A1 | 12/2010 | Oriet et al. |
| 2010/0316935 A1 | 12/2010 | Friesen et al. |
| 2010/0318234 A1 | 12/2010 | Moore et al. |
| 2010/0327655 A1 | 12/2010 | Okamoto et al. |
| 2011/0006737 A1 | 1/2011 | Saligram et al. |
| 2011/0027648 A1 | 2/2011 | Rolison et al. |
| 2011/0039181 A1 | 2/2011 | Friesen et al. |
| 2011/0044528 A1 | 2/2011 | Tsuchiya et al. |
| 2011/0070500 A1 | 3/2011 | Chen et al. |
| 2011/0070506 A1 | 3/2011 | Friesen et al. |
| 2011/0081563 A1 | 4/2011 | Christensen et al. |
| 2011/0086278 A1 | 4/2011 | Friesen et al. |
| 2011/0189551 A1 | 8/2011 | Friesen et al. |
| 2011/0198998 A1 | 8/2011 | Kasaba et al. |
| 2011/0199062 A1 | 8/2011 | Singnurkar |
| 2011/0200893 A1 | 8/2011 | Friesen et al. |
| 2011/0250512 A1 | 10/2011 | Friesen et al. |
| 2011/0305959 A1 | 12/2011 | Friesen et al. |
| 2011/0316485 A1 | 12/2011 | Krishnan et al. |
| 2012/0007432 A1 | 1/2012 | Rice et al. |
| 2012/0015264 A1 | 1/2012 | Friesen et al. |
| 2012/0021303 A1 | 1/2012 | Amendola et al. |
| 2012/0025614 A1 | 2/2012 | Taimela et al. |
| 2012/0025769 A1 | 2/2012 | Kikuchi et al. |
| 2012/0043823 A1 | 2/2012 | Stratakos et al. |
| 2012/0052404 A1 | 3/2012 | Friesen et al. |
| 2012/0068667 A1 | 3/2012 | Friesen et al. |
| 2012/0098499 A1 | 4/2012 | Friesen et al. |
| 2012/0112685 A1 | 5/2012 | Hartley et al. |
| 2012/0139496 A1 | 6/2012 | Krishnan et al. |
| 2012/0148426 A1 | 6/2012 | Bodzak |
| 2012/0187907 A1 | 7/2012 | Nysen |
| 2012/0187918 A1 | 7/2012 | Narayan et al. |
| 2012/0202127 A1 | 8/2012 | Friesen et al. |
| 2012/0270130 A1 | 10/2012 | Lemaire et al. |
| 2012/0295172 A1 | 11/2012 | Peled et al. |
| 2012/0321969 A1 | 12/2012 | Friesen et al. |
| 2013/0002023 A1 | 1/2013 | Liu et al. |
| 2013/0022881 A1 | 1/2013 | Friesen et al. |
| 2013/0049694 A1 | 2/2013 | Friesen et al. |
| 2013/0095393 A1 | 4/2013 | Friesen et al. |
| 2013/0115523 A1 | 5/2013 | Friesen et al. |
| 2013/0115525 A1 | 5/2013 | Friensen et al. |
| 2013/0115526 A1 | 5/2013 | Friesen et al. |
| 2013/0115531 A1 | 5/2013 | Amendola et al. |
| 2013/0115533 A1 | 5/2013 | Friesen et al. |
| 2013/0121033 A1 | 5/2013 | Lehn et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0207475 A1 | 8/2013 | Dong |
| 2013/0295471 A1 | 11/2013 | Visco et al. |
| 2013/0328403 A1 | 12/2013 | Kaufman et al. |
| 2014/0070612 A1 | 3/2014 | Stoeger |
| 2014/0091631 A1 | 4/2014 | Naden et al. |
| 2014/0162129 A1 | 6/2014 | Kim et al. |
| 2014/0176078 A1 | 6/2014 | Lai et al. |
| 2014/0184161 A1 | 7/2014 | Deal et al. |
| 2014/0191727 A1 | 7/2014 | Toussaint et al. |
| 2014/0217985 A1 | 8/2014 | Gifford et al. |
| 2014/0220256 A1 | 8/2014 | Ogg et al. |
| 2014/0220432 A1 | 8/2014 | Ogg et al. |
| 2014/0220434 A1 | 8/2014 | Ogg et al. |
| 2014/0220435 A1 | 8/2014 | Ogg et al. |
| 2014/0220440 A1 | 8/2014 | Ogg et al. |
| 2014/0220460 A1 | 8/2014 | Ogg et al. |
| 2014/0234730 A1 | 8/2014 | Albertus et al. |
| 2014/0265567 A1 | 9/2014 | Zubieta et al. |
| 2014/0342214 A1 | 11/2014 | Wegner et al. |
| 2015/0050527 A1 | 2/2015 | Jiang et al. |
| 2015/0086884 A1 | 3/2015 | Narayan et al. |
| 2015/0097518 A1 | 4/2015 | Bishop et al. |
| 2015/0104679 A1 | 4/2015 | Trimble et al. |
| 2015/0111115 A1 | 4/2015 | Nitta |
| 2015/0162840 A1 | 6/2015 | Frost et al. |
| 2015/0270731 A1 | 9/2015 | Adelmann et al. |
| 2015/0303530 A1 | 10/2015 | Toussaint et al. |
| 2015/0303539 A1 | 10/2015 | Stevens et al. |
| 2015/0372357 A1 | 12/2015 | Kruglak et al. |
| 2016/0006296 A1 | 1/2016 | Smith |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0043556 A1 | 2/2016 | Zubieta |
| 2016/0226269 A1 | 8/2016 | Hwang et al. |
| 2017/0012332 A1 | 1/2017 | Lee et al. |
| 2017/0070081 A1 | 3/2017 | Cher et al. |
| 2017/0141434 A1 | 5/2017 | Narayan et al. |
| 2017/0214265 A1 | 7/2017 | Stevens et al. |
| 2017/0222275 A1 | 8/2017 | Krishnan et al. |
| 2018/0010228 A1 | 1/2018 | Ogg et al. |
| 2018/0026243 A1 | 1/2018 | Stojanovic et al. |
| 2018/0123116 A1 | 5/2018 | Lee et al. |
| 2018/0219220 A1 | 8/2018 | Hayashi et al. |
| 2018/0241107 A1 | 8/2018 | Su et al. |
| 2019/0051908 A1 | 2/2019 | Chen et al. |
| 2019/0355960 A1 | 11/2019 | Hong et al. |
| 2020/0006745 A1 | 1/2020 | Westwood et al. |
| 2020/0006828 A1 | 1/2020 | Milshtein et al. |
| 2020/0014081 A1 | 1/2020 | Lee |
| 2020/0068358 A1 | 2/2020 | Macrae |
| 2020/0411932 A1 | 12/2020 | Weber et al. |
| 2021/0277527 A1 | 9/2021 | Narayan et al. |
| 2021/0320348 A1 | 10/2021 | Lim et al. |

FOREIGN PATENT DOCUMENTS

| | | |
|---|---|---|
| CN | 101552348 A | 10/2009 |
| CN | 101908662 A | 12/2010 |
| CN | 104106175 A | 10/2014 |
| CN | 206340592 U | 7/2017 |
| CN | 111430849 A | 7/2020 |
| EP | 0058090 A1 | 8/1982 |
| EP | 0277937 A1 | 8/1988 |
| EP | 0598144 B1 | 10/1996 |
| EP | 0637291 B1 | 10/1997 |
| EP | 0664932 B1 | 1/1998 |
| EP | 0823135 B1 | 11/1998 |
| EP | 0835334 B1 | 9/2002 |
| EP | 1027747 B1 | 9/2002 |
| EP | 1413001 B1 | 4/2005 |
| EP | 1266413 B1 | 5/2005 |

(56) References Cited

FOREIGN PATENT DOCUMENTS

| | | |
|---|---|---|
| EP | 1544937 A1 | 6/2005 |
| EP | 1977475 B1 | 2/2012 |
| EP | 2486622 B1 | 7/2014 |
| EP | 2424016 B1 | 10/2014 |
| EP | 2823528 B1 | 3/2016 |
| EP | 2586092 B1 | 1/2017 |
| EP | 2619835 B1 | 6/2017 |
| EP | 2792004 B1 | 11/2017 |
| EP | 2721688 B1 | 2/2018 |
| EP | 2774205 B1 | 3/2018 |
| EP | 2820698 B1 | 4/2018 |
| EP | 2954583 B1 | 4/2018 |
| EP | 2559097 B1 | 5/2018 |
| EP | 2596545 B1 | 6/2018 |
| EP | 2659536 B1 | 8/2018 |
| FR | 2879852 A1 | 6/2006 |
| GB | 1286173 A1 | 8/1972 |
| IN | 201917002254 A | 4/2019 |
| JP | H01190224 A | 7/1989 |
| JP | H0799731 A | 4/1995 |
| JP | H08140287 A | 5/1996 |
| JP | H08289468 A | 11/1996 |
| JP | 2001095232 A | 4/2001 |
| JP | 2004304960 A | 10/2004 |
| JP | 2006136146 A | 5/2006 |
| JP | 2008131750 A | 6/2008 |
| JP | 2010140736 A | 6/2010 |
| JP | 2010192313 A | 9/2010 |
| JP | 2010262876 A | 11/2010 |
| JP | 2011010464 A | 1/2011 |
| JP | 2011130562 A | 6/2011 |
| JP | 2012060723 A | 3/2012 |
| JP | 2012216310 A | 11/2012 |
| JP | 2013134838 A | 7/2013 |
| JP | 2014127289 A | 7/2014 |
| JP | 2014150056 A | 8/2014 |
| JP | 2015076379 A | 4/2015 |
| JP | 5952540 B2 | 7/2016 |
| JP | 6032018 B2 | 11/2016 |
| JP | 6234917 B2 | 11/2017 |
| JP | 2017216126 A | 12/2017 |
| JP | 2018006057 A | 1/2018 |
| JP | 2018006121 A | 1/2018 |
| JP | 2018067399 A | 4/2018 |
| JP | 6352884 B2 | 7/2018 |
| JP | 6682102 B2 | 4/2020 |
| WO | 8402429 A1 | 6/1984 |
| WO | 8905528 A1 | 6/1989 |
| WO | 0054359 A1 | 9/2000 |
| WO | 03088375 A2 | 10/2003 |
| WO | 2008058165 A2 | 5/2008 |
| WO | 2010065890 A1 | 6/2010 |
| WO | 2010091583 A1 | 8/2010 |
| WO | 2010115006 A1 | 10/2010 |
| WO | 2011035176 A1 | 3/2011 |
| WO | 2011044528 A1 | 4/2011 |
| WO | 2011114349 A2 | 9/2011 |
| WO | 2011163553 A1 | 12/2011 |
| WO | 2012012364 A1 | 1/2012 |
| WO | 2012174433 A2 | 12/2012 |
| WO | 2013164638 A2 | 11/2013 |
| WO | 2013166579 A1 | 11/2013 |
| WO | 2015042573 A1 | 3/2015 |
| WO | 2015132631 A1 | 9/2015 |
| WO | 2015145690 A1 | 10/2015 |
| WO | 2015150784 A1 | 10/2015 |
| WO | 2016197109 A1 | 12/2016 |
| WO | 2017006666 A1 | 1/2017 |
| WO | 2017049414 A1 | 3/2017 |
| WO | 2017075577 A1 | 5/2017 |
| WO | 2017117373 A1 | 7/2017 |
| WO | 2017205247 A1 | 11/2017 |
| WO | 2017223219 A1 | 12/2017 |
| WO | 2018009930 A2 | 1/2018 |
| WO | 2018018036 A1 | 1/2018 |
| WO | 2018187561 A1 | 10/2018 |
| WO | 2020006419 A1 | 1/2020 |
| WO | 2020023912 A1 | 1/2020 |

OTHER PUBLICATIONS

Written Opinion in PCT/IB2017/055535, mailed Nov. 30, 2017, 8 pages.
Yang et al. "Organo-sulfur molecules enable iron-based battery electrodes to meet the challenges of large-scale electrical energy storage." Energy & Environmental Science 7.8 (2014): 2753-2763.
Yang et al. "Unique aqueous Li-ion/sulfur chemistry with high energy density and reversibility." Proceedings of the National Academy of Sciences 114.24 (2017): 6197-6202.
You et al. "A microbial fuel cell using permanganate as the cathodic electron acceptor." Journal of power sources 162.2 (2006): 1409-1415.
Yu et al. "A voltage-enhanced, low-cost aqueous iron-air battery enabled with a mediator-ion solid electrolyte." ACS Energy Letters 2.5 (2017): 1050-1055.
Yun et al. "Materials and device constructions for aqueous lithium-sulfur batteries." Advanced Functional Materials 28.38 (2018): 1707593, 1-17.
Zhu et al. "A high-rate and long cycle life solid-state lithium-air battery." Energy & Environmental Science 8.12 (2015): 3745-3754.
Non-Final Office Action in U.S. Appl. No. 18/535,643, mailed Sep. 23, 2024, 9 pages.
Jorne et al. "Suppression of dendrites and roughness during electrodeposition by impinging flow." Journal of the Electrochemical Society 134.6 (1987): 1399-1402.
Kadyk et al. "How to enhance gas removal from porous electrodes ?. " Scientific reports 6.1 (2016): 1-14.
Klaus et al. "Effects of Fe electrolyte impurities on Ni (OH) 2/NiOOH structure and oxygen evolution activity." The Journal of Physical Chemistry C 119.13 (2015): 7243-7254.
Lee et al. "Metal-air batteries with high energy density: Li-air versus Zn-air." Advanced Energy Materials 1.1 (2011): 34-50.
Li et al. "A high-energy and low-cost polysulfide/iodide redox flow battery." Nano Energy 30 (2016): 283-292.
Li et al. "Air-breathing aqueous sulfur flow battery for ultralow-cost long-duration electrical storage." Joule 1.2 (2017): 306-327.
Li et al. "Recent advances in zinc-air batteries." Chemical Society Reviews 43.15 (2014): 5257-5275.
Licht S. "A novel aqueous aluminuml permanganate fuel cell." Electrochemistry communications 1.1 (1999): 33-36.
Licht S. "Aqueous solubilities, solubility products and standard oxidation-reduction potentials of the metal sulfides." Journal of the Electrochemical Society 135.12 (1988): 2971-2975.
Mainar et al. "Alkaline aqueous electrolytes for secondary zinc-air batteries: an overview." International Journal of Energy Research 40.8 (2016): 1032-1049.
Malkhandi et al. "Organo-Sulfur Additives for Suppressing Hydrogen Evolution in Iron-air Battery." ECS Meeting Abstracts. No. 13. IOP Publishing (2011): 1.
Matsuda et al. "Preparation of hydroxide ion conductive KOH-ZrO2 electrolyte for all-solid state iron/air secondary battery." Solid State Ionics 262 (2014): 188-191.
Maurya et al. "A review on recent developments of anion exchange membranes for fuel cells and redox flow batteries." Rsc Advances 5.47 (2015): 37206-37230.
McKerracher et al. "A review of the iron-air secondary battery for energy storage." ChemPlusChem 80.2 (2015): 323-335.
Merle et al. "Anion exchange membranes for alkaline fuel cells: A review." Journal of Membrane Science 377.1-2 (2011): 1-35.
Mitra et al. "A stable and electrocatalytic iron electrode for oxygen evolution in alkaline water electrolysis." Topics in Catalysis 61 (2018): 591-600.
Mitra et al. "An efficient and robust surface-modified iron electrode for oxygen evolution in alkaline water electrolysis." Journal of The Electrochemical Society 165.5 (2018): F392-F400.

(56) References Cited

OTHER PUBLICATIONS

Narayan et al. "Bi-functional oxygen electrodes-challenges and prospects." The Electrochemical Society Interface 24.2 (2015): 65-69.
Neburchilov et al. "Metal-air and metal-sulfur batteries: fundamentals and applications." CRC Press, 2016, 210 pages.
Office Action in AU2011101611, mailed Feb. 6, 2012, 2 pages.
Office Action in AU2013323342, mailed Sep. 5, 2016, 3 pages.
Office Action in AU2015217236, mailed Oct. 23, 2018, 3 pages.
Office Action in CN201120307185.2, mailed Jan. 13, 2012, 9 pages.
Office Action in CN201380059132.5, mailed Sep. 2, 2016, 12 pages.
Office Action in CN201380059132.5, mailed Jan. 12, 2018, 12 pages.
Office Action in CN201580014600.6, mailed May 10, 2018, 8 pages.
Office Action in CN201780069914.5, mailed Sep. 29m 2022, 7 pages.
Office Action in JP2015534745, mailed Jun. 13, 2017, 8 pages.
Office Action in JP2015534745, mailed Sep. 22, 2017, 7 pages.
Office Action in JP2016550772, mailed Dec. 19, 2018, 14 pages.
Office Action in JP2018011455, mailed Dec. 20, 2018, 11 pages.
Office Action in U.S. Appl. No. 12/885,268, mailed Aug. 29, 2013, 15 pages.
Ojefors et al. "An iron-air vehicle battery." Journal of Power Sources 2.3 (1978): 287-296.
Pan et al. "Constructing ionic highway in alkaline polymer electrolytes." Energy & Environmental Science 7.1 (2014): 354-360.
Roe et al. "A high energy density vanadium redox flow battery with 3 M vanadium electrolyte." Journal of The Electrochemical Society 163.1 (2015): A5023-A5028.
Salloum et al. "Sequential flow membraneless microfluidic fuel cell with porous electrodes." Journal of Power Sources 180.1 (2008): 243-252.
Sayilgan et al. "A review of technologies for the recovery of metals from spent alkaline and zinc-carbon batteries." Hydrometallurgy 97.3-4 (2009): 158-166.
Sen et al. "Metal-air battery assessment." No. PNL-6475. Pacific Northwest National Lab.(PNNL), Richland, WA (United States), 1988, 1-96.
Sevinc et al. "In-situ tracking of NaFePO4 formation in aqueous electrolytes and its electrochemical performances in Na-ion/polysulfide batteries." Journal of Power Sources 412 (2019): 55-62.
Smedley et al. "A regenerative zinc-air fuel cell." Journal of power sources 165.2 (2007): 897-904.
Smith et al. "Water oxidation catalysis: electrocatalytic response to metal stoichiometry in amorphous metal oxide films containing iron, cobalt, and nickel." Journal of the American Chemical Society 135.31 (2013): 11580-11586.
Tekin et al. "A new sodium-based aqueous rechargeable battery system: the special case of Na0.44MnO2/dissolved sodium polysulfide." Energy Technology 5.12 (2017): 2182-2188.
Thirsk J. "Electrochemistry." In: Thirsk J, ed. Electrochemistry. Vol 4. Oxford: The Chemical Society, Alden Press; 1974, 1-9.
Tian et al. "The effect of Na2S additive in alkaline electrolyte on improved performances of Fe-based air batteries." Electrochimica Acta 259 (2018): 196-203.
Trocino et al. "High performance solid-state iron-air rechargeable ceramic battery operating at intermediate temperatures (500-650° C)." Applied Energy 233 (2019): 386-394.
Vijayamohanan et al. "Rechargeable alkaline iron electrodes." Journal of power sources 34.3 (1991): 269-285.
Viswanathan et al. "Electrical conductivity in Li2O2 and its role in determining capacity limitations in non-aqueous Li-O2 batteries." The Journal of chemical physics 135.21 (2011): 1-12.
Wang et al. "Sustainable aqueous metal-air batteries: An insight into electrolyte system." Energy Storage Materials 52 (2022): 573-597.
Wei et al. "An aqueous redox flow battery based on neutral alkali metal ferri/ferrocyanide and polysulfide electrolytes." Journal of the Electrochemical Society 163.1 (2015): A5150-A5153.

Weinrich et al. "Understanding the nanoscale redox-behavior of iron-anodes for rechargeable iron-air batteries." Nano Energy 41 (2017): 706-716.
Abate, I. "Metal-Air Batteries: Promises and Challenges", Submitted as coursework for PH240, Stanford University, 2016.
Al et al. "A novel graphene-polysulfide anode material for high-performance lithium-ion batteries." Scientific Reports 3.1 (2013): 1-5.
Al-Hoshan et al. "Synthesis, physicochemical and electrochemical properties of nickel ferrite spinels obtained by hydrothermal method for the oxygen evolution reaction (OER)." International Journal of Electrochemical Science 7.6 (2012): 4959-4973.
Application Note: FSA3357 Single Pole/Triple Throw Eliminates Second Single Pole/Double Throw and Reduces Board Space, Dec. 2002, Fairchild Semiconductor Corporation, 2 pages.
Arunchander et al. "Synthesis of flower-like molybdenum sulfide/graphene hybrid as an efficient oxygen reduction electrocatalyst for anion exchange membrane fuel cells." Journal of Power Sources 353 (2017): 104-114.
Bandal et al. "Iron-based heterogeneous catalysts for oxygen evolution reaction; change in perspective from activity promoter to active catalyst." Journal of Power Sources 395 (2018): 106-127.
Blurton et al. "Metal/air batteries: their status and potential-a review." Journal of Power Sources 4.4 (1979): 263-279.
Burke et al. "Cobalt-iron (oxy) hydroxide oxygen evolution electrocatalysts: the role of structure and composition on activity, stability, and mechanism." Journal of the American Chemical Society 137.10 (2015): 3638-3648.
Burke et al. "Oxygen evolution reaction electrocatalysis on transition metal oxides and (oxy) hydroxides: activity trends and design principles." Chemistry of Materials 27.22 (2015): 7549-7558.
Caponio et al. "Modular and bi-directional energy storage system compliant with accumulators of different chemistry." 11th International Conference on Electrical Power Quality and Utilisation. IEEE, 2011.
Chen et al. "Harvesting polysulfides by sealing the sulfur electrode in a composite ion-selective net." Journal of Power Sources 368 (2017): 38-45.
Cheng et al. "Metal-air batteries: from oxygen reduction electrochemistry to cathode catalysts." Chemical Society Reviews 41.6 (2012): 2172-2192.
Cherepy et al. "A zinc/air fuel cell for electric vehicles." Fourteenth Annual Battery Conference on Applications and Advances. Proceedings of the Conference (Cat. No. 99TH8371). IEEE, 1999: 1-5.
Chiang et al. "High Capacity, Temperature-Stable Lithium Aluminum Manganese Oxide Cathodes for Rechargeable Batteries." Electrochemical and solid-state letters 2.3 (1998): 107-110.
Chiang et al. "Reversible Chlorite Anion/Chlorine Dioxide Redox Couple for Low-Cost Energy Storage." The Journal of Physical Chemistry C 127.8 (2023): 3921-3927.
Cohen et al. "Fabrication and preliminary testing of a planar membraneless microchannel fuel cell." Journal of Power Sources 139.1-2 (2005): 96-105.
Colli et al. "High energy density MnO 4-/MnO 4 2- redox couple for alkaline redox flow batteries." Chemical Communications 52.97 (2016): 14039-14042.
Cui et al. "Improved cycle iron molten air battery performance using a robust fin air electrode." Journal of The Electrochemical Society 164.2 (2016): A88-A92.
Demir-Cakan et al. "An aqueous electrolyte rechargeable Li-ion/polysulfide battery." Journal of Materials Chemistry A 2.24 (2014): 9025-9029.
Demir-Cakan et al. "Use of ion-selective polymer membranes for an aqueous electrolyte rechargeable Li-ion- polysulphide battery." Journal of Materials Chemistry A 3.6 (2015): 2869-2875.
Egashira M. "Secondary batteries-metal-air systems| iron-air (secondary and primary)." Elsevier (2009): 372-375.
Examination Report in IN201917013690, mailed 2020-04-29, 5 pages.
Ferrigno et al. "Membraneless vanadium redox fuel cell using laminar flow." Journal of the American Chemical Society 124.44 (2002): 12930-12931.

(56) References Cited

OTHER PUBLICATIONS

Figueredo-Rodriguez et al. "A rechargeable, aqueous iron air battery with nanostructured electrodes capable of high energy density operation." Journal of The Electrochemical Society 164.6 (2017): A1148-A1157.
Gross et al. "Aqueous polysulfide-air battery with a mediator-ion solid electrolyte and a copper sulfide catalyst for polysulfide redox." ACS Applied Energy Materials 1.12 (2018): 1-27.
Hall D. "Ni (OH) 2-impregnated anodes for alkaline water electrolysis." Journal of The Electrochemical Society 130.2 (1983): 317-321.
Hall D. "Porous Nickel-Coated Steel Anodes for Alkaline Water Electrolysis: Corrosion Resistance." Journal of the Electrochemical Society 129.2 (1982): 310-315.
Hang et al. "Effect of additives on the electrochemical properties of Fe2O3/C nanocomposite for Fe/air battery anode." Journal of Electroanalytical Chemistry 762 (2016): 59-65.
Hang et al. "Effect of metal-sulfide additives on electrochemical properties of nano-sized Fe2O3-loaded carbon for Fe/air battery anodes." Journal of power sources 168.2 (2007): 522-532.
Hopkins et al. "Suppressing corrosion in primary aluminum-air batteries via oil displacement." Science 362.6415 (2018): 658-661.
Imanishi et al. "The lithium air battery: fundamentals." New York: Springer, 2014.
International Preliminary Report on Patentability in PCT/IB2017/055535, mailed Nov. 13, 2018, 27 pages.
International Preliminary Report on Patentability in PCT/US2009/040658, mailed Dec. 2, 2010, 5 pages.
International Preliminary Report on Patentability in PCT/US2013/062208, mailed Dec. 31, 2014, 16 pages.
International Preliminary Report on Patentability in PCT/US2015/015407, mailed Jan. 19, 2016, 13 pages.
International Preliminary Report on Patentability in PCT/US2018/026243, mailed Oct. 17, 2019, 9 pages.
International Preliminary Report on Patentability in PCT/US2018/026672, mailed Mar. 26, 2019, 31 pages.
International Search Report and Written Opinion in PCT/US2015/015407, mailed May 12, 2015, 8 pages.
International Search Report and Written Opinion in PCT/US2018/026243, mailed Jul. 27, 2018, 12 pages.
International Search Report and Written Opinion in PCT/US2018/026672, mailed Jul. 25, 2018, 19 pages.
International Search Report and Written Opinion in PCT/US2019/039844, mailed Oct. 23, 2019, 15 pages.
International Search Report and Written Opinion in PCT/US2019/039867, mailed Nov. 15, 2019, 19 pages.
International Search Report and Written Opinion in PCT/US2019/039973, mailed Jan. 13, 2020, 26 pages.
International Search Report and Written Opinion in PCT/US2019/043745, mailed Nov. 13, 2019, 17 pages.
International Search Report and Written Opinion in PCT/US2023/030955, mailed Dec. 14, 2023, 10 pages.
International Search Report and Written Opinion in PCT/US2023/072684, mailed Dec. 18, 2023, 10 pages.
International Search Report in PCT/IB2017/055535, mailed Nov. 30, 2017, 3 pages.
Jayashree et al. "Air-breathing laminar flow-based microfluidic fuel cell." Journal of the American Chemical Society 127.48 (2005): 16758-16759.
Ji et al. "Stabilizing lithium-sulphur cathodes using polysulphide reservoirs." Nature communications 2.1 (2011): 1-7.
Jin et al. "A high-fidelity multiphysics model for the new solid oxide iron-air redox battery: part I: Bridging mass transport and charge transfer with redox cycle kinetics." Journal of Power Sources 280 (2015): 1-36.

\* cited by examiner

HYBRID BATTERY SYSTEM

CROSS REFERENCE TO RELATED APPLICATIONS

This patent application is a continuation of Ser. No. 18/307,355, filed Apr. 26, 2023, which is a continuation of Ser. No. 16/332,431, filed Mar. 12, 2019, which is the U.S. National Phase of PCT/IB2017/055535, filed Sep. 3, 2017, which claims priority to U.S. provisional patent application no. 62/395,112, filed on Sep. 15, 2016, with the entirety of each of these applications hereby incorporated herein by reference.

FIELD OF THE INVENTION

The invention is directed to a hybrid battery system comprising multiple different battery units.

BACKGROUND

Battery back-up systems are configured to handle a power outage (including sags or drops where the power drops but is not entirely out) from the primary power source for a limited amount of time. The battery or batteries of the battery back-up system are discharged during a power outage and the state of charge of the back-up system is reduced. If the power outage is too long, the battery back-up system may fall below a state of charge that is sufficient to provide adequate power to the load. In many applications, a battery back-up system is employed for a relatively short amount of time, or for a time that drops the state of charge of the battery system only a fraction of a full state of charge. These applications may occasionally have an outage that is longer, however, and scaling the back-up system for characteristics of optimized performance in daily/frequent cycling conditions and optimized standby/occasional back-up power demand requirements may be too expensive. Lower efficiency battery systems may be less expensive initially, but are less efficient in terms of charge/discharge cycles and therefor have a higher operating cost. For example, lithium ion batteries are more efficient but are also more expensive compared to lead acid batteries.

SUMMARY OF THE INVENTION

One aspect of the present invention provides a hybrid battery system for power storage in a power network comprising a power source and a load. The system comprising a battery system, which comprises: a first rechargeable battery unit having a first battery chemistry; and a second rechargeable battery unit having a second battery chemistry, the first and second battery chemistries being different from each other. Such differences may provide, for example, different energy efficiencies (i.e., the ratio of energy input for charging the second battery to the energy output during discharge may be higher than for the first battery) and/or power efficiencies (i.e., the ratio of power input for charging the first battery to the power output during discharge may be higher than for the second battery) between the battery units. A controller selectively couples the battery units of the battery system to the power network (a) for delivery of electrical energy from the battery system to the load during discharging, and (b) for receipt of electrical energy from the power source for charging of the battery system during charging. A power supply voltage sensor detects an operating voltage of the power supply. The controller comprises logic for switching the controller between charging and discharging of the battery system based on the operating voltage being in a charging range or discharging range, respectively. The controller further includes charging mode selection logic for selecting between modes of charging based on the operating voltage within the charging range, the modes including (a) charging both said battery units simultaneously, (b) charging only the first battery unit, and (c) charging only the second battery unit.

The invention may be directed to a stationary hybrid battery back-up system. The two different battery units may include a first battery unit that is different from a second battery unit in terms of recharging efficiency, cycle life, power capability, depth of discharge threshold, temperature threshold, internal impedance threshold, charger rate efficiency and/or stand-by efficiency. The battery back-up system of the present invention may comprise a control system that couples a first and/or second battery unit to a load and/or charger as a function of the battery properties and inputs to the control system. A control system may be programmed or embedded with logic to switch from a first to a second battery to maximize overall system efficiency. In an exemplary embodiment, the invention is directed to a stationary hybrid battery back-up system comprising two different battery units, a first battery unit having a high charge/recharge efficiency and a second battery unit having a lower charge/discharge efficiency than the first battery unit. In an exemplary embodiment, the first battery unit comprises non-metal-air batteries and a second battery unit comprises metal-air batteries. A stationary hybrid battery back-up system is configured to be located in a fixed position and coupled to a load, such as a residence, business or industrial building or operation and the like. The non-metal air battery unit may have a higher charge/discharge efficiency than the metal-air battery unit and may be coupled with the load at the onset of a power outage from a primary power source, such as a power grid or power generator. The power drawn from the hybrid battery back-up system may be initially only from the first battery unit and, in the event that the power outage is short, only the first battery unit may be employed for providing the back-up power. Since the first battery unit may comprises higher efficiency batteries than the second battery unit, short duration outages can be covered efficiently by the hybrid battery back-up system, wherein the charge/discharge efficiency of the first battery unit is high, and higher than the charge/discharge efficiency of the second battery unit. The secondary battery unit may be discharged in the event of a lower duration outage or when a high power demand is required. A controller system may be programmed for a particular combination of first and second battery unit types to maximize efficiency for an expected frequency and duration of outages.

A first battery unit may have an efficiency that is higher than the second battery unit such as, at least about 10% higher, at least about 50% higher, at least about 100% higher and any range between and including the values provided.

In an exemplary embodiment, a control system of the hybrid battery back-up system may switch from a first to a second battery unit as a function of the power requirements and the power capability of the two battery units. The hybrid battery back-up system may be coupled to a load that has a variable power demand requirement and depending on the power level required, the control system may couple the first and/or second battery unit in an effort to maximize overall system efficiency. For example, a first battery unit may have a lower maximum power capability than a second battery unit and in cases where the power demand from the load exceeds a threshold power demand level, the second battery may be coupled to the load, either alone or in parallel with the first battery unit. Again, the control system may be programed based on the types of battery units employed, with an effort to maximize overall efficiency and longevity of the system.

In an exemplary embodiment, the hybrid battery back-up system comprises a first battery unit having a high power capability and a second battery unit having a lower power capability. A first battery unit may have a power capability that is greater than the second battery unit, such as at least about 10% greater, at least about 20% greater, at least about 50% greater, at least about two times greater, at least about three times greater, at least about four times greater, at least about 10 times greater and any range between and including the values provided. In an exemplary embodiment, a first battery unit comprises lithium ion batteries having a power capability that about two times or more greater than the power capability of a lead acid battery. Power capability, as used herein, is the maximum power output of a battery or battery unit and may change a function of the state of charge.

In an exemplary embodiment, a control system of the hybrid battery back-up system may switch from a first to a second battery unit as a function of cycle life of the battery units. For example, a first battery unit may have a higher cycle life than a second battery unit and a control system may employ the first battery unit for a majority of the back-up power requirements to increase the longevity of the battery back-up system. The second battery unit may be employed only when there are very long duration outages and the first battery unit drops below a threshold state of charge, or when there is a high power demand. In this way, the overall system life can be extended as the second battery unit, having a lower cycle life, is not employed for battery back-up power as often as the first battery unit.

In an exemplary embodiment, the hybrid battery back-up system comprises a first battery unit having a higher cycle life than a second battery unit, such as at least about 10% greater, at least about 20% greater, at least about 50% greater, at least about 100% greater at least about 200% greater, at least about 300% greater, at least about 400% greater, at least about 500% greater and any range between and including the values provided.

In an exemplary embodiment, a control system of the hybrid battery back-up system may switch from a first to a second battery unit as a function of the depth of discharge. For example, a first battery unit may have high cycle life even when the battery is cycled at high depth of discharge, higher than a second battery unit. Alternatively, a first battery unit may have higher efficiency when the battery is cycled at a shallow depth of discharge from 100% charged state. The second battery unit may have a lower charging efficiency than the first battery unit or a lower charging efficiency below a depth of discharge level, or when the state of charge is below a threshold value. The second battery may also have a lower cycle life at high depth of discharge. In an effort to maximize overall system efficiency and/or life, the control system may employ the first battery unit and second battery unit to avoid discharging the second battery unit below or above some threshold value. For example, the first battery unit may be employed initially when there is a power outage and the second battery unit may be employed as required when there is a high power demand or when the first battery unit drops below a threshold state of charge. If the power outages are frequent, first battery cycles at high state of charge, increasing the system efficiency and/or life. Cycle life of lithium batteries at high state of charge is lower due to damage to solid electrolyte interface. Cycle life of metal-air batteries are not affected negatively at high state of charge. A hybrid system with lithium and metal-air batteries can be optimized for high cycle life using a controller by operating the state of charge of both batteries in the optimal range. Alternatively, a small portion of the energy from the first battery may also be preserved to prevent the second battery from cycling at high depth of discharge. The discharging sequence may include discharging the first battery to 90% depth of discharge, followed by discharging the second battery to 100% depth of discharge, discharging the remaining 10% of the energy from the first battery. If short duration power outages frequently occur at this stage, first battery cycles at low state of charge preserving the life of second battery which may have low cycle life at low state of charge. Lead acid batteries have very low cycle life when cycled at low state of charge. Cycle life of metal-air batteries are not affected negatively at low state of charge. A hybrid system with lead acid and metal-air batteries can be optimized for high cycle life using a controller by operating the state of both batteries in the optimal range.

In an exemplary embodiment, the hybrid battery back-up system comprises a first battery unit having a higher cycle life than a second battery unit, such as at least about 10% greater, at least about 20% greater, at least about 50% greater, at least about 100% greater, at least about 200% greater, at range between and including the values provided at states of charge between 75% and 100% or 0-25% and any range between.

In an exemplary embodiment, a control system of the hybrid battery back-up system may switch from a first to a second battery unit as a function of charge rate efficiency or charge rate. For example, the control system may employ the first and/or second battery unit to provide back-up power as a function of the charge rate efficiency or charge rate of the battery units. Some battery back-up systems may require frequent back-up power and one of the battery units may have a quicker charge rate, or charge more efficiently at high rates than a second battery unit. In some instances, high power may available to charge for a limited time or power may be available at low cost for a limited time. Examples include renewable power source such as solar panels and low electricity costs after midnight in some regions. To this end, the control system may employ the first battery unit initially unless some other criteria requires the second battery unit to be employed. In another example, a battery back-up system may be required very infrequently and/or for longer outages, whereby a second battery unit having a more efficient slow charge rate may be employed more often.

In an exemplary embodiment, the hybrid battery back-up system comprises a first battery unit having a higher charge rate than a second battery unit, such as at least about 10% greater, at least about 20% greater, at least about 50% greater, at least about 100% greater and any range between and including the values provided. In addition, the efficiency of charging of a first battery unit at a first rate may be higher than an efficiency of charging a second battery unit at this same rate by at least about 10% greater, at least about 20% greater, at least about 50% greater, at least about 100% greater at least about 200% greater, at least about 500% greater, at least about 1000% greater, at least about 2000% greater and any range between and including the values provided.

In an exemplary embodiment, a control system of the hybrid battery back-up system may switch from a first to a second battery unit as a function of stand-by efficiency. For example, a first battery unit may have a higher stand-by efficiency than a second battery unit and therefore the control system may employ the first battery unit in a stand-by mode more often than the second battery unit in an effort to maximize efficiency of the overall system. Alkaline metal air batteries have a lower self discharge rate and higher efficiency than Nickel Iron batteries in idle conditions but have a lower efficiency in operation. A hybrid system with the two batteries can provide optimal efficiency to support frequent short duration cycling and infrequent/ standby backup needs. In an exemplary embodiment, the hybrid battery back-up system comprises a first battery unit having a higher stand-by efficiency than a second battery unit, such as at least about 10% greater, at least about 20% greater, at least about 50% greater, at least about 100% greater, at least about 200% greater, at least about 300% greater, at least about 500% greater and any range between and including the values provided.

In the event that the power outage is longer, wherein the first battery unit drops below a threshold state of charge, the second battery unit may be coupled to the load. The threshold state of charge of the first battery unit may be about 75%, about 65%, about 50%, about 40% and any value between the threshold values provide. The second battery unit may be coupled to the load when the first battery unit drops below the threshold state of charge and the first battery unit may be disconnected from the load, thereby conserving power within the first battery unit. The first battery unit may be recoupled to the load when the state of charge of the second battery unit drops below a threshold value. Coupling both batteries to the load when the second battery unit drops below a threshold value may enable the second battery unit to be more fully discharged as the combination of battery units can support the load as the second battery unit drops below a state of charge that could support the load alone. In addition, the first battery may be recoupled to the load when a power demand level from the load exceeds the peak power capability of the second battery unit. This increased power demand level above the maximum power capability may be temporary and the first battery unit may be decoupled from the load when the increased power demand subsides. Likewise, a control system may switch from a first to a second battery unit when the internal impedance of the first battery unit exceeds a threshold internal impedance value.

An exemplary battery back-up system may comprise a de-de converter and/or an AC-DC converter to enable the first and second battery units to be coupled in series or parallel and coupled to a load as required for battery back-up power or for charging.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
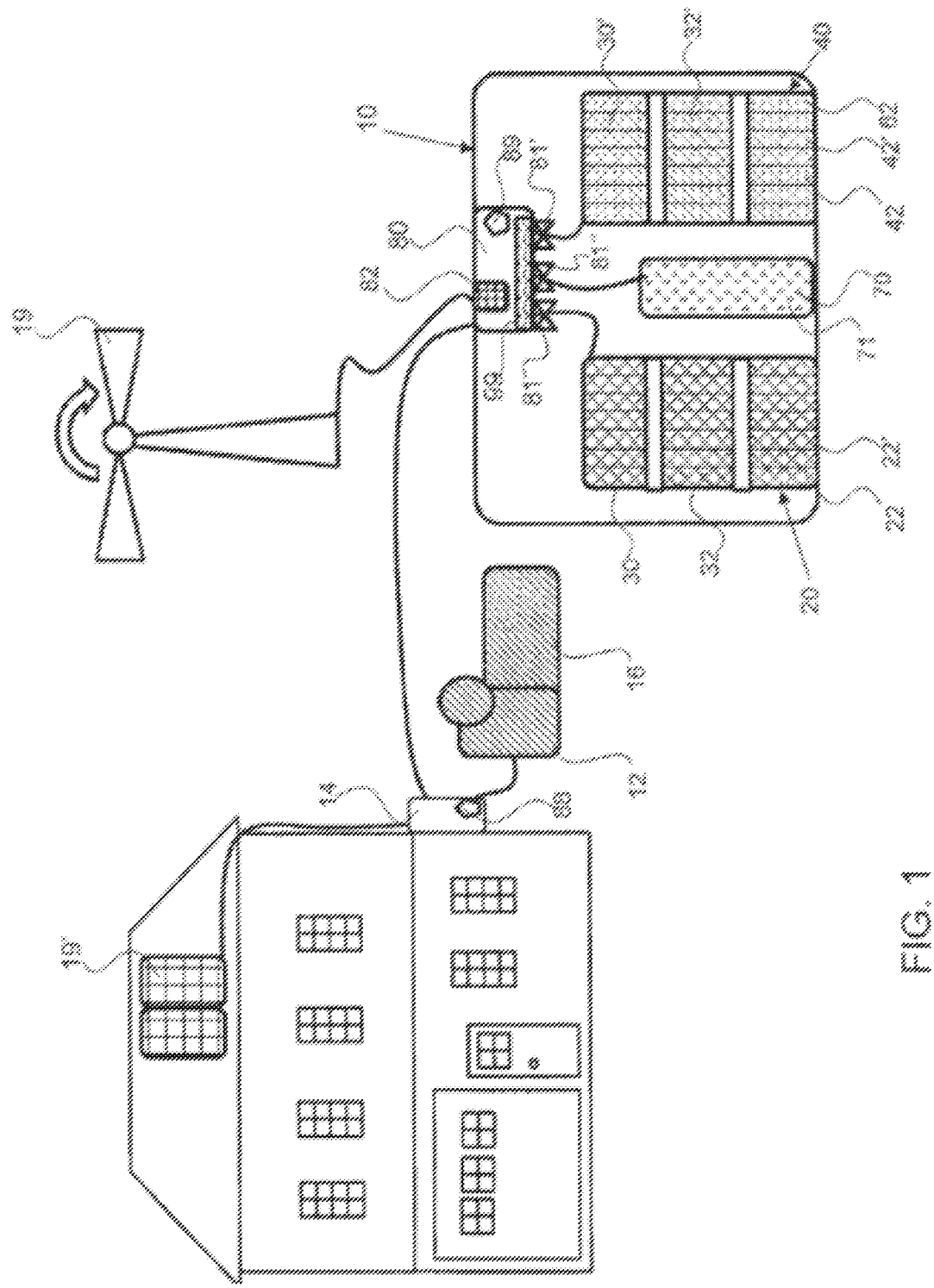
FIG. 1 shows an exemplary hybrid battery back-up system connected with a load and to a renewable energy source.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENT(S)

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary hybrid battery back-up system 10 is connected with a load 14 and to a power source. The power source may be an auxiliary power supply 19, such as a renewable power supply (e.g., a wind turbine 19 or solar panel(s) 19' or a diesel generator 16 with a power management system 12. The power source may also be a wide area AC grid, such as is conventionally powered by power plants or large scale renewable energy resources. The power source may be a local grid also, such as one that powers a smaller village or area isolated from wide area power grids, which may also use renewable or other types of power generation.

The exemplary hybrid battery back-up system comprises a first battery unit 20 having a plurality of first rechargeable (a/k/a secondary) batteries 22 and a second battery unit 40 comprising a plurality of rechargeable (a/k/a secondary) second batteries 40. The first and second battery units comprise a plurality of individual batteries configured in a battery node 30, and a plurality of nodes configured into a module 32. The individual batteries, nodes and/or modules may be connected in series or in parallel depending on the application. In addition, the first and second battery units may be connected in parallel or series as required by the application. In this embodiment, a supplemental power source 70, such as a super capacitor 71, is also configured with the hybrid battery back-up system as an option.

The battery or batteries in each unit have a different battery chemistry to provide different energy and/or power efficiencies between the battery units. The chemistry of the battery(ies) in the first battery unit may be referred to as a first battery chemistry, and the chemistry of the battery(ies) in the second battery unit may referred to as a second battery chemistry. The battery chemistry includes the fuel, oxidant, and electrolyte for ion conduction within the battery.

As shown, a control system or controller 80 comprises a processor 82 containing logic for performing the functions described herein. The logic may be embedded as software instructions, data or look-up tables, data profiles, circuitry, or a combination of both, and the processor may be a general purpose computing device or an application specific integrated circuit (ASIC). In general, the control system 80 is designed for selectively coupling the battery units to the power network including the load and one or more power sources for (a) delivery of electrical energy from the battery system to the load during discharging, and (b) receipt of electrical energy from a power source for charging of the battery system during charging.

The control system receives inputs related to the status of the load, such as from a load sensor 88 that detects a break in power supply from the primary power source 12. The control system also receives an input from a voltage sensor 89 that directly or indirectly detects an operating voltage of the power being delivered to the load from the one or more power sources. The voltage sensor can be any sensor that can indirectly or directly detect voltage, and may detect another characteristic to indirectly detect the voltage itself. The voltage sensor may be included in the battery system directly, or located distally from the battery system in more direct connection with the power source(s) and load. In some embodiments, the voltage from one or more power sources may be stepped down for application to the battery system (i.e., a 220V power signal may be stepped down to a lower voltage useable for battery charging), and the voltage sensor may detect the stepped down voltage as the operating voltage to provide an indirect detection of the voltage actually being delivered to the load by the one or more power sources.

The controller couples, decouples and recouples the first and second battery units 20, 40 and supplemental power source 70 to the load through switches 81, 81' and 81" respectively. A power converter 99 may be configured to convert power output from one or more of the battery units to enable the battery units to be coupled in series or parallel depending on the power requirement of the system. Likewise, a power converters, dc-dc or ac-dc for example, may be used to provide charging power to the battery units. The one or more power supply devices may be connected to a coupling 15, such as a busbar, and power to the load may be provided through the busbar and maintained within an operational voltage operation range.

When the control system detects an outage or drop below a threshold in the power provided to the load from the one or more power sources, the control system couples the first battery unit 20 with the load 14 by switch 81, wherein electrical power from the first battery unit is provided to the load. As described herein, in an embodiment only the first battery unit may be electrically coupled with the load unless the state of charge of the first battery unit drops below a threshold value, or a power demand level from the load exceeds the maximum power capability of the first battery unit; in which case, the second battery unit or a capacitor may be electrically coupled to the load. The first battery unit may contain batteries that are a higher efficiency than the batteries of the second battery unit. Short power outages that require only the first battery unit to be coupled to the load, therefore are more efficiently covered by the hybrid battery-back up system.

As shown in FIG. 1, the first battery unit may contain only one type of battery, such as a lithium ion battery and the second battery unit may contain only metal-air batteries. A first or second battery unit may comprise dissimilar individual batteries, however. For example, the second battery unit 40 comprises a third battery 62, such as a hybrid metal-air battery, that is of a different type than the second batteries 42, 42'.

In an embodiment, the first battery unit may comprise rechargeable non-metal air batteries including, but not limited to lithium ion, iron phosphate, lithium oxide, lithium ion polymer, nickel metal hydride, nickel cadmium, nickel zinc, silver zinc, lead-acid, nickel-iron and the like. In an exemplary embodiment, the first battery unit is made up of only one type of battery, such as lithium ion batteries that typically has a charge/discharge efficiency of about 80-90%. The individual batteries of the first battery unit may be coupled together in series or in parallel as required by the application.

The second battery unit may comprise a rechargeable metal-air battery including, but not limited to, zinc-air, iron air, and hybrid metal air batteries, as described for example in U.S. Patent Application Publication No. 20110250512 (Ser. No. 13/083,929), to Fluidic Inc., the entirety of which is incorporated by reference herein. As described in this incorporated '512 publication, the hybrid metal-air cell may comprise a fuel electrode, an oxygen evolving electrode and an air electrode. As also described in this incorporated '512 publication, a metal air battery cell comprises a plurality of electrodes comprising (i) a fuel electrode comprising a metal fuel and (ii) an air electrode for exposure to an oxygen source. An electrode of the plurality other than the fuel electrode (i.e. the air electrode or an additional electrode) comprises a reversible metal capable of reversible oxidation to a reducible species thereof and reduction to an oxidizable species thereof. Also, an electrode of the plurality other than the fuel electrode has an oxygen evolving functionality. For purposes of clarity, the number of electrodes could be two or more. The metal-air battery cell also comprises an ionically conductive medium for conducting ions among the plurality of electrodes.

The metal-air battery, as described herein, may have any construction or configuration, and the examples described herein are not intended to be limiting. For example, the cell may be constructed in accordance with any one of the following patent applications, the entirety of each of which is incorporated herein by reference: U.S. Pat. Nos. 8,168, 337, 8,309,259, 8,491,763, and 8,492,052, U.S. Publication Nos. 20100316935, 20100285375, and 20110070506, and U.S. Application Ser. Nos. 61/177,072, 61/243,970, 61/249, 917, 61/301,377, 61/304,928, 61/329,278, 61/334,047, 61/365,645, 61/378,021, 61/394,954, 61/358,339 and 61/267,240.

The charge/discharge efficiency of a zinc-air battery is typically about 50-60% whereas the hybrid metal-air battery can have an efficiency of about 60% to 95%. Since the metal-air battery of the hybrid battery back-up system has a lower efficiency, it is employed for providing battery back-up power only after the first battery unit drops below a threshold state of charge, therein improving system efficiency for short duration power outages. The first battery unit may have a charge/discharge efficiency that is about 10% or more, about 20% or more, about 30% or more or about 90% or more than that of the second battery unit. In an exemplary embodiment, the second battery unit consist only of a single type of metal-air battery, such as zinc-air batteries. The second battery unit may comprise a combination of metal-air battery types, such as zinc-air and hybrid metal-air batteries. The individual batteries of the second battery unit may be coupled together in series or in parallel as required by the application.

As is mentioned in the above-incorporated patent applications, the fuel electrode 12 of a metal-air battery may comprise a single body on which the fuel is reduced/electrodeposited, or it may comprise a series of spaced apart bodies on which the fuel is reduced/electrodeposited progressively or in parallel simultaneously, as discussed in some of the above-incorporated patent applications. Neither approach is intended to be limiting.

Using the zinc example, the oxidation half-cell reaction at the fuel electrode 12 during discharge in an alkaline electrolyte may be expressed as:

$$Zn+4OH \rightarrow Zn(OH)4\text{2-}+2e- \tag{1}$$

In solution, the zincate ion may further react to form zinc oxide as follows:

$$Zn(OH)42 \rightarrow ZnO+H2O+2OH- \tag{2}$$

As can be appreciated, the oxidation of zinc to zinc oxide (or zinc to zincate if it remains dissolved in the solution) is reversible, and thus these reactions may occur in reverse during re-charge to electrodeposit the zinc on the fuel electrode.

The control system 80 may also monitor the state of charge of the first and or second battery through any conventional means including through monitoring the power drawn from the battery. The control system 80 may measure the current of a battery power supply to a load and use this to calculate a state of charge. In another embodiment, the controller 80 measures an impedance value of the battery to determine a state of charge.

As shown in FIG. 1, a plurality of auxiliary power sources, 19, 19' are optionally coupled with the hybrid battery back-up system. The wind power system 19 is coupled directly to the hybrid battery back-up system and the solar power system 19 is coupled to the load with a cable connecting it also to the hybrid battery back-up system. A renewable power supply derives power from a renewable source such as the sun or wind and includes wind power generating systems, and solar power systems comprising a photovoltaic cell, as shown in FIG. 1. The renewable power supply may comprise a inverter or charge controller that enables the power generated by the renewable power supply to be coupled to the battery units for delivery to a load or for charging the battery unit(s).

Figure 2:
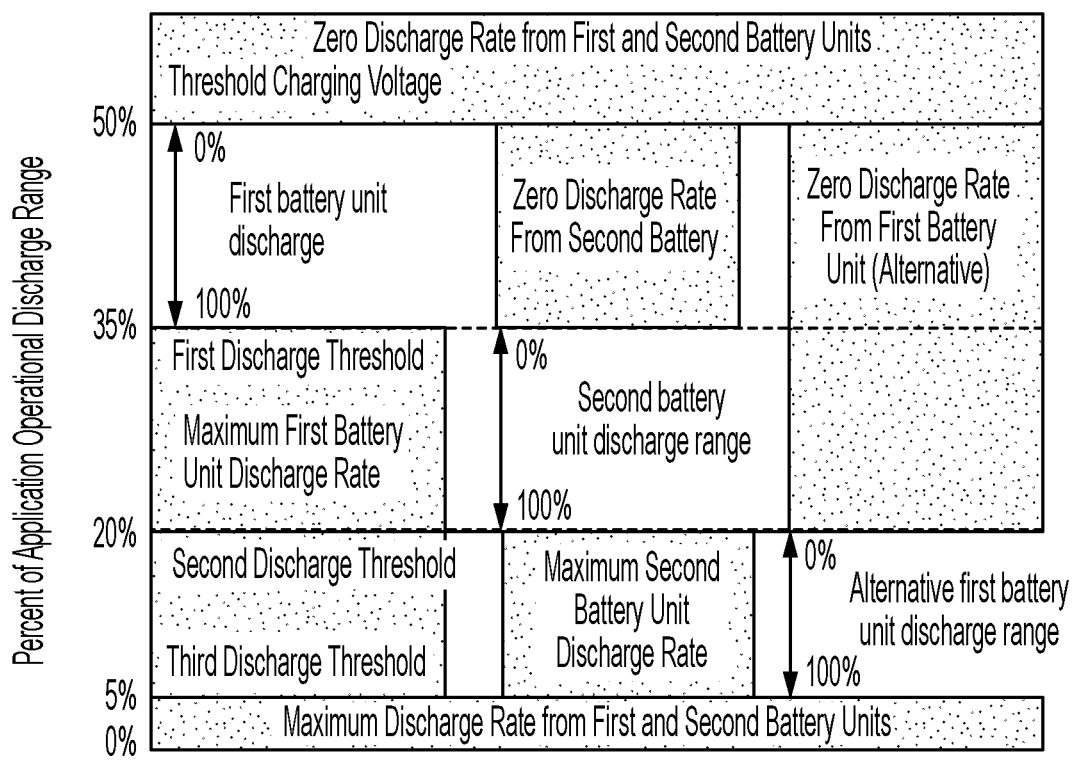
FIG. 2 shows a graph of an exemplary hybrid battery back-up system discharge current sharing control.
Figure 3:
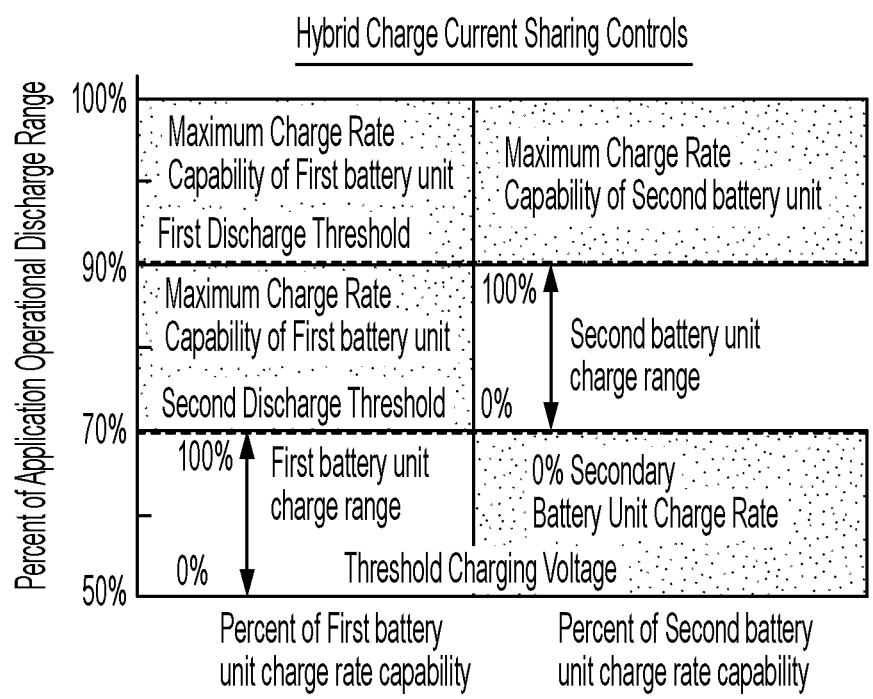
FIG. 3 shows a graph of an exemplary hybrid battery back-up system charge current sharing control.

Referring now to FIGS. 2 and 3, an exemplary battery back-up electrical power system controls the rate of charging and discharging of a first and second battery unit to enable an efficient use of power and to provide effective backup power to a load. The controller may adjust the discharge rate of first and second battery using the output voltage from each battery unit and a power converter. In an exemplary embodiment, the power delivered to the load from the one or more power sources has a target operational voltage range for the application and this operational voltage range may be expresses in terms of percentage of this range, or 0% to 100%. For example, an application operational voltage range of 10V from 46-56V may be the range targeted for the load, with 0% of the range being 46V and 100% of the range being 56V.

The control system's 80 logic is configured for switching the control system 80 and its associated components between charging and discharging of the battery based on the operating voltage being in a charging range or a discharging range, respectively. An exemplary battery back-up electrical power system may have a set threshold voltage or voltages that determine whether and how the battery system and the battery units thereof will be charged or discharged. A threshold voltage may be express as a percentage of the operating operational voltage range.

For example, there may be one set voltage threshold at 50% of the operational range (51V in the 46-56V example), as shown in FIGS. 2 and 3 and labelled "threshold charging voltage". The range above that set voltage threshold would be considered the charging range, because the power supplied to the load is relatively robust and more power is available for use in battery charging (assuming the batteries are not already charged). In contrast, the range below that set voltage would be considered the discharging range, because the power supplied to the load is weaker and it may be beneficial to discharge additional power from the battery system (assuming the batteries have not reached a discharge limit).

In other embodiments, there may be more than one set voltage threshold. For example, it is possible that the discharge range could be below 49V, and the charge range could be above 53V. That would mean that no discharging or charging of the battery system occurs between 49-53V, as that may be understood to be a range where there is sufficient voltage for the load, but not enough to warrant directing additional power away for battery recharging. Thus, the invention is not limited to one set voltage threshold for defining what are regarded as charge and discharge ranges. The example of FIGS. 2 and 3 and the logic reflected therein has a single set threshold voltage, and the embodiment will be described in reference to that for convenience, understanding that the invention is not limited to a single threshold.

In this embodiment, the lower portion of the operating DC voltage range, for example, 5V, or an operating DC voltage from 46-51V, is the discharge range. Within that range, the batteries of one or both battery units 20, 40 may be discharged, and that is accomplished by further selections of discharge modes that may be used. Specifically, the logic in the control system further includes discharging mode selection logic for selecting between modes of discharged based on the detected operating voltage within the discharging range. Those modes include (a) discharging both battery units 20, 40 simultaneously, (b) discharging only the first battery unit 20, and (c) discharging only the second battery unit 40. As shown in FIG. 2, when the operating voltage is in the discharge range but above a first discharge threshold, or between 35-50% of the operational voltage range, 49.5-51 V, the control system 80 will cause the first battery unit 20 to discharge up to its maximum discharge rate to meet the load demand and the second battery unit will not discharge. Optionally, the rate of discharge for the first battery unit 20 may increase in a progressive manner (such as gradually or in steps) from 0% to 100% as the operating voltage drops within that part of the range. If the operating voltage falls below 35% of the operational voltage range, or below the first discharge threshold, i.e. below 49.5V, the control system 80 will continue to discharge the first battery unit 20 at its maximum rate, but will also discharge the second battery unit 40 as well. Similarly to the initial discharging of the first battery unit, the rate of discharge for the second battery unit 40 may optionally increase in a progressive manner from 0% to 100% as the operating voltage drops within that part of the range, thus resulting in both battery units being at maximum as the operating voltage reaches a second discharge threshold.

As another option, in embodiments where a third energy storage device is included, such as another battery in one of the units or in its own unit, or a different type of storage device such as a supercapacitor, when the operational voltage drops below the second discharge threshold, set in FIG. 2 at below 20% of the operational voltage range, i.e. 47V, the first and second battery units will discharge at their respective maximum discharge rates to meet the load demand and the third energy storage device (labelled as the alternative first battery unit as an example) will be discharged. The rate of discharge for the third storage device may also optionally increase in a progressive manner from 0% to 100% as the operating voltage drops within that part of the range to a third discharge voltage (below which all the batteries are discharging at maximum capacity)

A separate threshold event, may override the discharge control diagram as shown in FIG. 2. For example, if the temperature of a cell or cells exceeds a threshold, the environmental temperature ambient to a cell falls below or above a threshold temperature, an impedance value of a cell or cells exceeds a threshold, a state of charge for a cell or cells falls below a threshold, or a time of discharge exceeds a threshold, that may override any logic. In that event, the control system may not use the approach of FIG. 2, and may opt to use the other battery unit unaffected by the threshold event to provide the discharge power. Or it may opt to use both battery units in parallel, such as may be done when a cell or sub-set of cells in one unit is affected by the threshold event and not used, thus relying on the other battery unit to supply supplemental discharge power.

As shown in FIG. 3, an exemplary battery back-up electrical power system controls the rate of charging of a first and second battery unit. Following the example provided above, an exemplary battery back-up electrical power system having an operating voltage range from 46-56V may only charge when the operating voltage is in the charging range above the set threshold voltage at 50%, or 51V. Within that range, the batteries of one or both battery units 20, 40 may be charged, and that is accomplished by further selections of charge modes that may be used. Specifically, the logic in the control system further includes charging mode selection logic for selecting between modes of charging based on the detected operating voltage within the charging range. Those modes include (a) charging both battery units 20, 40 simultaneously, (b) charging only the first battery unit 20, and (c) charging only the second battery unit 40.

As shown in FIG. 3, both the first and second battery units are charged at their respective maximum charge rates when the operating voltage is above at first charge threshold, e.g. 90% of the operating voltage range (i.e. above 50V). When the operating voltage drops below 90%, or the first charge threshold, the first battery unit may continue to charge at a maximum charge rate and the second battery unit is also charged. Optionally, the rate of charge for the second battery unit 40 may decrease in a progressive manner (such as gradually or in steps) from 100% to 0% as the operating voltage drops within that part of the range. When the operating voltage drops below 70%, or a second charge threshold, the first battery unit is charged and the second battery is not charged. Optionally, the rate of charge for the first battery unit 20 may decrease from 100% to 0% as the operating voltage drops within that part of the range. When the operating voltage drops below the threshold charging voltage, both the first and second battery units cease charging.

As was the case with discharging, a threshold event may override this logic and cause the controller to switch charging of a first battery or a second battery unit, or switch charging of a first battery unit to the second battery unit and vice versa. For example, if while charging the first battery unit become too hot, the controller may switch charging to the second battery unit until the temperature of the first battery unit drops below a threshold temperature.

The controller can adjust the discharge rate of first or second battery by hardware, software or a combination of hardware and software controls independently without any communication between other first or second batteries connected in parallel. Alternatively, the controller of first or second battery can communicate between other controllers to determine and adjust the discharge rate.

The controller can also adjust the Ampere-hour capacity rate by adjusting the discharge rate. In a system with many first and second batteries, the controller can distribute the current or power demand for discharging. The controller can use control schemes known to persons skilled in the art. For example, a proportional, differential, proportional-integral, proportional-differential or proportional-integral-differential control scheme can be used to adjust the current or power drawn from any first or second battery.

It may be desirable to perform droop compensation in the electrochemical cell system as described in U.S. Patent Application Publication No. 20140091631 (Ser. No. 14/039, 285 filed on Sep. 27, 2013), entitled Droop Compensation Using Current Feedback the entirety of which is hereby incorporated by reference herein. Droop compensation may be used to facilitate equalization of currents, which may correspondingly equalize a lifecycle of the cell modules and the electrochemical cells therein. By equalization of currents, it may be understood that the droop compensation may facilitate generally or essentially equalizing the currents (e.g., driving the currents towards equalization, into a state generally regarded in the art as being equalized). In an embodiment, droop compensation may be performed utilizing a control circuit associated with a controller in each cluster control unit. As such, in some embodiments droop compensation may be performed on a cell module by cell module basis. That is, using the technique in the aforementioned application, the droop compensation will bring the currents output by the various modules towards equilibrium. In other embodiments, droop compensation may be performed among subsets of the cell modules, such as by being implemented at the level of the cell interface units. In still other embodiments, droop compensation may be performed on a cell by cell basis, being implemented associated with each individual electrochemical cells. For example, all the cells in a given battery unit, or cell module of a battery unit, may have control circuits using droop compensation to bring the currents output by the various cells towards equilibrium. Other implementations are also possible. For example, droop compensation circuits could be used at both the individual cell level and the module level.

Figure 4:
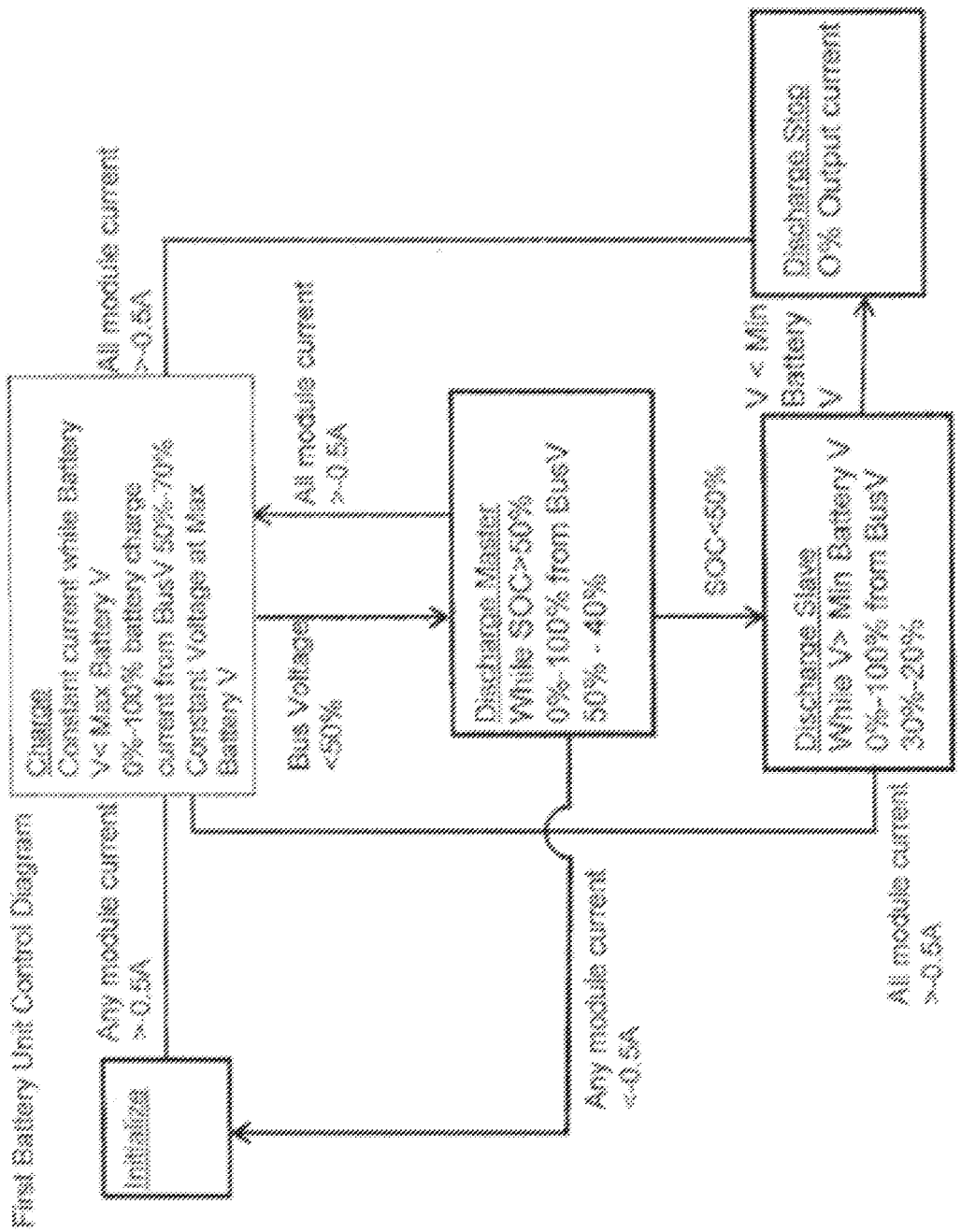
FIG. 4 shows an exemplary hybrid battery back-up system first battery unit control diagram.

FIG. 4 shows an exemplary control diagram for the first battery unit. When no load is required from the hybrid back-up battery system, the first battery unit may receive a charge in accordance with the logic discussed above. The diagram also shows that the first battery unit is discharged when there is a demand in accordance with the logic discussed above until the state of charge of the first battery unit drops below 50% of a full state of charge value. The second battery unit is then discharged. The first battery unit may be a lithium ion battery unit, containing only lithium ion batteries. This control diagram illustrates how a threshold event, such as the state of charge of the first battery unit, may cause the system to switch the battery unit being discharged.

Figure 5:
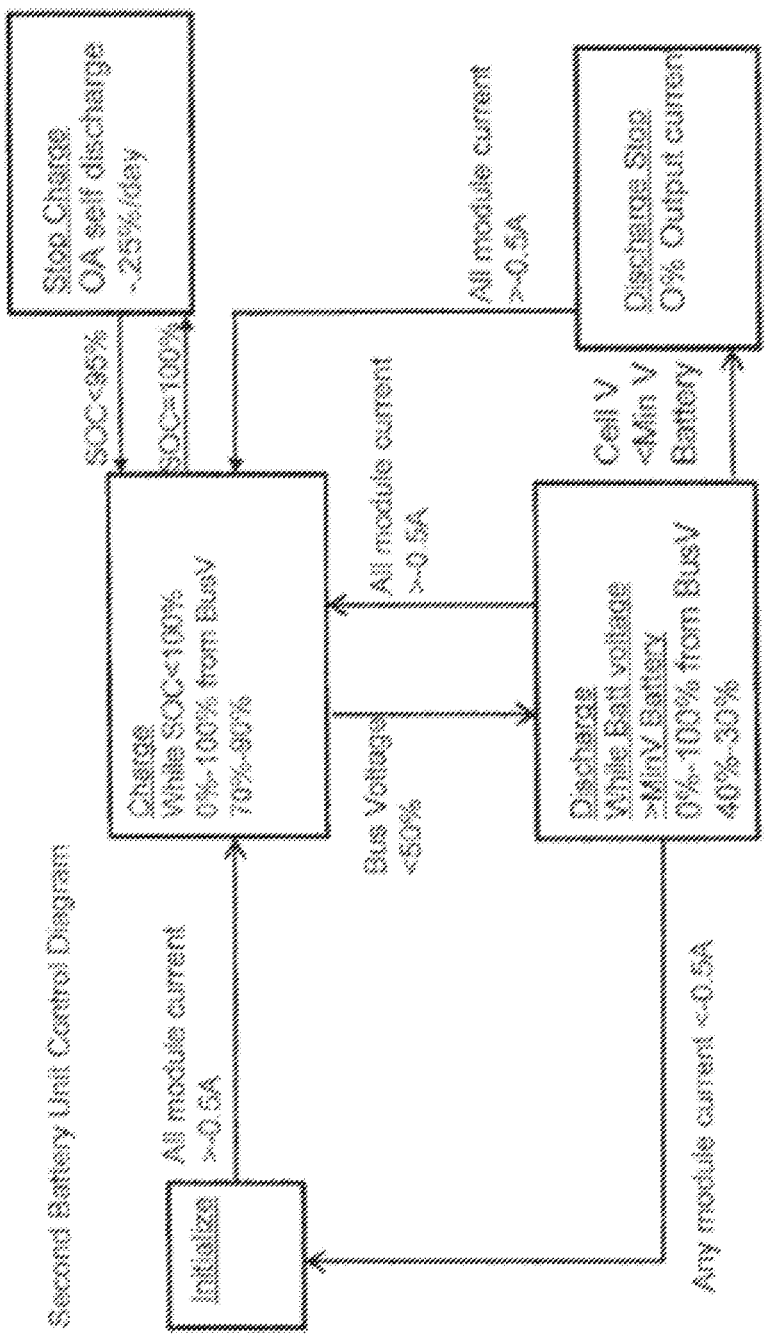
FIG. 5 shows an exemplary hybrid battery back-up system second battery unit control diagram.

FIG. 5 shows an exemplary hybrid battery back-up system second battery control diagram. When no load is required from the hybrid back-up battery system, and the first battery unit is charged above a threshold value, the second battery unit may receive a charge. The diagram shows that the second battery unit is discharged until the second battery unit individual battery voltage drops to less than 0.95V, the minimum cell voltage threshold used to limit further discharge.

Figure 6:
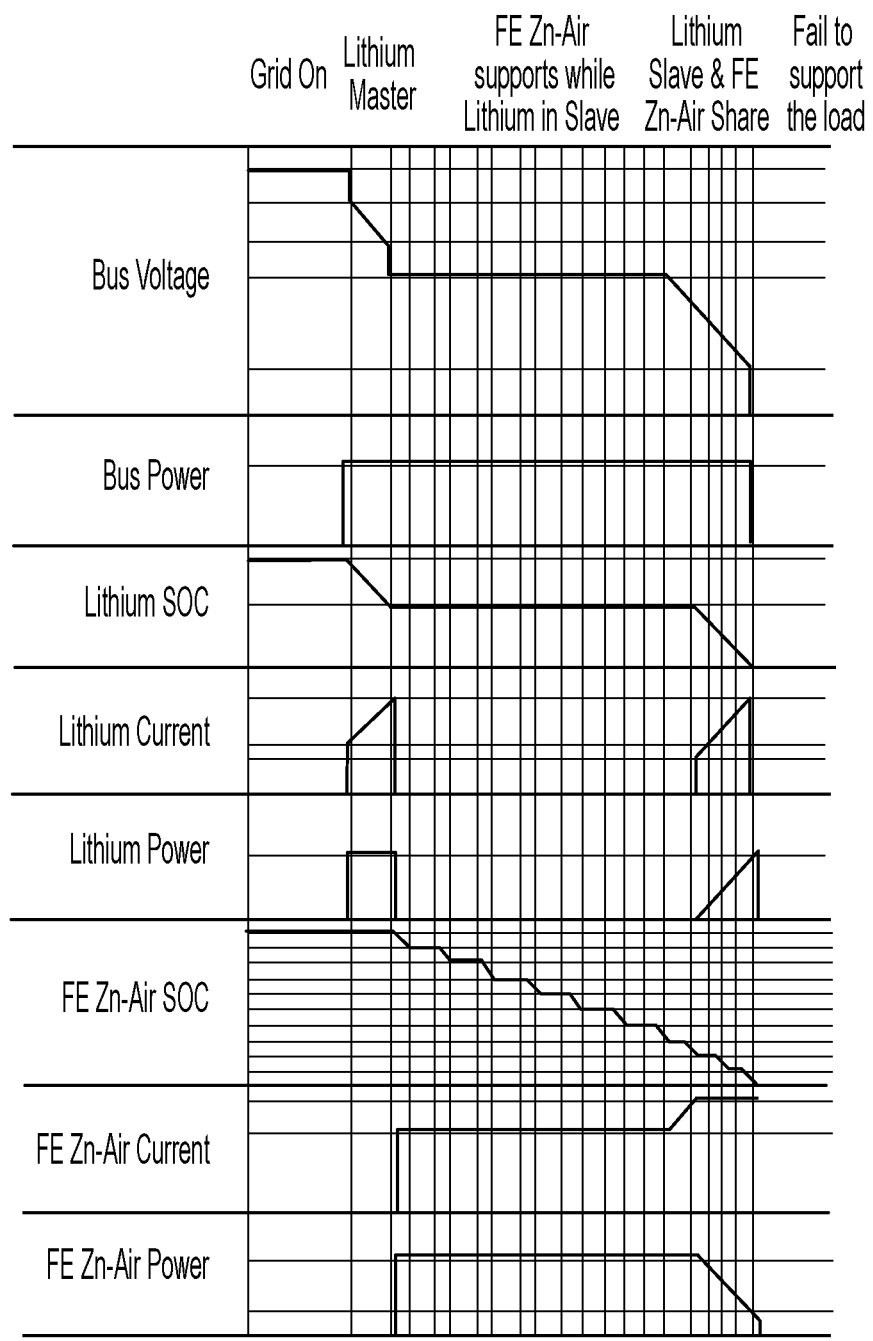
FIG. 6 shows an exemplary hybrid battery back-up system discharge power supply schedule for a power outage event.

FIG. 6 shows an exemplary hybrid battery back-up system discharge power supply schedule for a power outage event. Note that the both the lithium ion battery and the metal air battery are coupled to the load towards the end of a discharge cycle to enable a more complete discharge of the metal-air battery.

Charge/discharge efficiency, or simply efficiency, as used herein with respect to the battery or battery units, is the efficiency of a charging and discharging cycle. Not all of the energy used to charge a battery results in useable energy during discharge, there are some losses during both charging and discharging that reduce efficiency.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A battery system comprising:
   a first rechargeable battery unit having a first battery chemistry;
   a second rechargeable battery unit having a second battery chemistry, the first and second battery chemistries different from each other;
   a power supply voltage sensor operable to detect an operating voltage applied to a load from a power source; and
   a control system configured for
      selectively coupling the first rechargeable battery unit and the second rechargeable battery unit to the load for delivery of electrical energy from the battery system to the load during discharging,
      selectively coupling the first rechargeable battery unit and the second rechargeable battery unit to the power source for charging of the battery system during charging,
      receiving the operating voltage from the power supply voltage sensor,
      selectively charging and discharging the first rechargeable battery unit and the second rechargeable battery unit based on the operating voltage,
      determining whether the operating voltage is within a charge range and below a first charge threshold, and
      charging the first rechargeable battery unit in response to determining that the operating voltage is within the charge range and below the first charge threshold.

2. The battery system of claim 1, wherein the control system is configured for discharging the first rechargeable battery unit in response to determining that the operating voltage is within a discharge range and above a first discharge threshold.

3. The battery system of claim 2, wherein the control system is configured for discharging the first rechargeable battery unit and the second rechargeable battery unit at two different discharge rates in response to determining that the operating voltage is below the first discharge threshold.

4. The battery system of claim 1, wherein the control system is further configured for detecting a threshold event of the first rechargeable battery unit and switching from discharging the first rechargeable battery unit to discharging the second rechargeable battery unit in response to detecting the threshold event of the first rechargeable battery unit.

5. The battery system of claim 4, wherein configuration of the control system for detecting the threshold event of the first rechargeable battery unit includes configuration of the control system for determining that a first battery unit temperature exceeds a threshold temperature.

6. The battery system of claim 4, wherein configuration of the control system for detecting the threshold event of the first rechargeable battery unit comprises determining that an environmental temperature of the first rechargeable battery unit exceeds a threshold environmental temperature.

7. The battery system of claim 4, wherein configuration of the control system for detecting the threshold event of the first rechargeable battery unit includes configuration of the control system for determining that an environmental temperature of the first rechargeable battery unit has fallen below a threshold environmental temperature.

8. The battery system of claim 4, wherein configuration of the control system for detecting the threshold event of the first rechargeable battery unit comprises configuration of the control system for determining that a first battery unit voltage has fallen below a threshold voltage for the first rechargeable battery unit.

9. The battery system of claim 4, wherein configuration of the control system for detecting the threshold event of the first rechargeable battery unit includes configuration of the control system for determining that a depth of discharge of the first rechargeable battery unit has fallen below a threshold depth of discharge level.

10. The battery system of claim 4, wherein configuration of the control system for detecting the threshold event of the first rechargeable battery unit includes configuration of the control system for determining that a state of charge of the first rechargeable battery unit has fallen below a threshold state of charge.

11. The battery system of claim 10, wherein configuration of the control system for detecting the threshold event of the first rechargeable battery unit comprises configuration of the control system for determining that a power demand exceeds a power capability threshold of the first rechargeable battery unit.

12. The battery system of claim 11, wherein configuration of the control system for determining that the power demand exceeds the power capability threshold of the first rechargeable battery unit includes configuration of the control system for determining that the power demand is greater than about 90% of a power capability of the first rechargeable battery unit.

13. The battery system of claim 10, wherein configuration of the control system for determining that the state of charge of the first rechargeable battery unit has fallen below the threshold state of charge includes configuration of the control system for determining an impedance of the first rechargeable battery unit.

14. The battery system of claim 13, wherein configuration of the control system for determining that the state of charge of the first rechargeable battery unit has fallen below the threshold state of charge includes configuration of the control system for determining that the impedance of the first rechargeable battery unit exceeds about 110% of the impedance of the first rechargeable battery unit at a maximum state of charge.

15. The battery system of claim 1, wherein the control system is further configured for charging the first rechargeable battery unit and the second rechargeable battery unit at two different charge rates in response to determining that the operating voltage is above the first charge threshold.

16. The battery system of claim 1, wherein the first rechargeable battery unit includes one or more lithium ion batteries.

17. The battery system of claim 1, wherein the second rechargeable battery unit comprises one or more rechargeable metal-air batteries.

18. The battery system of claim 1, wherein the second rechargeable battery unit comprises one or more rechargeable zinc-air batteries.

* * * * *